US012700682B2

(12) United States Patent
Wilson et al.

(10) Patent No.: US 12,700,682 B2
(45) Date of Patent: Aug. 4, 2026

(54) DIRECT RADIATING ARRAY ("DRA") ANTENNA, METHOD OF ASSEMBLING A DRA ANTENNA, AND SYSTEM FOR MANAGING HEAT GENERATED BY A DRA ANTENNA

(71) Applicant: MacDonald, Dettwiler and Associates Corporation, Sainte-Anne-de-Bellevue (CA)

(72) Inventors: Stephen Wilson, Pointe Claire (CA); Ayman Megahed, Sainte-Anne-de-Bellevue (CA); Stephane Lamoureux, Sainte-Anne-de-Bellevue (CA)

(73) Assignee: MacDonald, Dettwiler and Associates Corporation, Sainte-Anne-de-Bellevue (CA)

(*) Notice: Subject to any disclaimer, the term of this patent is extended or adjusted under 35 U.S.C. 154(b) by 416 days.

(21) Appl. No.: 18/253,324

(22) PCT Filed: Nov. 24, 2021

(86) PCT No.: PCT/CA2021/051679
§ 371 (c)(1),
(2) Date: May 17, 2023

(87) PCT Pub. No.: WO2022/120461
PCT Pub. Date: Jun. 16, 2022

(65) Prior Publication Data

US 2024/0006778 A1 Jan. 4, 2024

Related U.S. Application Data

(60) Provisional application No. 63/119,087, filed on Nov. 30, 2020.

(51) Int. Cl.
*H01Q 23/00* (2006.01)
*H01Q 5/40* (2015.01)
*H01Q 1/28* (2006.01)

(52) U.S. Cl.
CPC ............... *H01Q 23/00* (2013.01); *H01Q 5/40* (2015.01); *H01Q 1/288* (2013.01)

(58) Field of Classification Search
CPC .......... H01Q 1/288; H01Q 1/02; H01Q 23/00; H01Q 5/40; H01Q 9/0414; H01Q 21/065
See application file for complete search history.

(56) References Cited

U.S. PATENT DOCUMENTS 9,172,145 B2 * 10/2015 Puzella .............. H01Q 21/0025
2003/0218566 A1 * 11/2003 Feldle .................... H01Q 23/00
342/372

(Continued)

FOREIGN PATENT DOCUMENTS

AU 2010229122 A1 * 9/2011 ......... H01Q 21/0087
CN 101164251 A * 4/2008 ......... H04B 7/18515

(Continued)

OTHER PUBLICATIONS

European Patent Office, Extended European Search Report issued on European Application No. 21901737.3, Oct. 7, 2024.

(Continued)

*Primary Examiner* — Seokjin Kim
(74) *Attorney, Agent, or Firm* — Own Innovation; James W. Hinton; Kent C. Howe

(57) ABSTRACT

Direct radiating array ("DRA") antenna assemblies, methods of assembling a DRA antenna assembly, and systems for managing heat generated by a DRA antenna assembly are provided. A DRA antenna assembly includes: multiple radiating element modules, each radiating element module including a first dissipative component; multiple digital (Continued)

beamforming boards, each digital beamforming board having a radio frequency ("RF") connection to and servicing a subset of the radiating element modules and including a second dissipative component; and a thermal plate having a top surface and a bottom surface, the radiating elements and the digital boards mounted to the top surface and the bottom surface, respectively, such that the first and second dissipative components are heat sunk to the thermal plate. The thermal plate includes a plurality of passive two-phase flow devices embedded therein for transporting heat received from the first and second dissipative components away from an interior of the DRA assembly.

12 Claims, 20 Drawing Sheets

(56) References Cited

U.S. PATENT DOCUMENTS

| | | | | |
|---|---|---|---|---|
| 2009/0179791 | A1* | 7/2009 | Kalian | H01Q 21/064 342/368 |
| 2010/0066631 | A1* | 3/2010 | Puzella | H01Q 9/0414 29/601 |
| 2011/0209864 | A1 | 9/2011 | Figus et al. | |
| 2015/0280650 | A1* | 10/2015 | Brown | H01P 5/19 361/720 |
| 2017/0025749 | A1* | 1/2017 | Frye | H01Q 21/0025 |
| 2017/0054208 | A1* | 2/2017 | Pietila | H01Q 1/52 |
| 2018/0309208 | A1* | 10/2018 | Cosner | H01Q 5/50 |
| 2022/0354020 | A1* | 11/2022 | Purpus | H05K 7/20436 |
| 2025/0219724 | A1* | 7/2025 | Miller | H04B 7/18541 |

FOREIGN PATENT DOCUMENTS

| | | | | |
|---|---|---|---|---|
| CN | 110754016 B * | 3/2022 | | H04B 7/18515 |
| WO | WO-2018119153 A2 * | 6/2018 | | H01Q 9/0414 |
| WO | WO-2020054001 A1 * | 3/2020 | | H01Q 23/00 |

OTHER PUBLICATIONS

International Search Report and Written Opinion issued on corresponding PCT International Patent Application No. PCT/CA2021/051679 and issued on Jan. 31, 2022.

* cited by examiner

DIRECT RADIATING ARRAY ("DRA") ANTENNA, METHOD OF ASSEMBLING A DRA ANTENNA, AND SYSTEM FOR MANAGING HEAT GENERATED BY A DRA ANTENNA

TECHNICAL FIELD

The following relates generally to antennas and antenna assemblies for radio frequency (RF) communication, and more particularly to direct radiating array antennas.

INTRODUCTION

As the number of connected devices and the need for communication between them continues to increase, along with the generation and proliferation of data generated by such devices, so too does demand for communications systems for facilitating such communication. One such manner of facilitating communication is with communications satellites. The market for communications satellites is set to explode as it becomes easier to launch satellites into space and the demand for satellite-based communication increases.

Communications satellites facilitate communications through onboard antennas. One such example of an antenna is an active direct radiating array ("DRA") antenna. It is important for such antennas to manage and balance size, mass, and power. It is often desired to have an antenna that may provide any one or more of reduced size, reduced mass, or reduced power consumption, or that may provide performance trade-offs while effectively managing the size, mass, and power of the antenna. For example, in spaceborne applications, the allocated overall weight for an antenna may be constrained, thereby limiting the number of radiating elements and the efficiency of the antenna.

Continuously increasing frequency bands of the signal for communication and the quantity of beams carrying the signals may make it more and more difficult to have a significant number of mechanical and electrical components concentrated in a location in proximity to the array while maintaining antenna efficiency especially for Low Earth Orbit ("LEO") applications. LEO makes the DRA scan requirement larger, which then makes the elements spacing narrower (i.e. spacing between radiating elements). LEO is therefore much more challenging than Geostationary Orbits ("GEO") or Medium Earth Orbits ("MEO") in terms of mechanical and electrical components concentrated in close proximity. To reduce signal losses through different components, such components may need to be positioned as close as possible to the array to limit signal path length as much as possible.

There is also a need to effectively manage heat generated by components of the antenna, such as power converters and signal amplifiers, to avoid temperature increases that may reduce overall antenna efficiency. This is particularly true as heat generating components of the antenna are brought into closer proximity to one another. Structures for dissipating the heat generated by antenna components are thus required in situations of significant dissipation. Such structures can, however, complicate the overall integration of the antenna and can be heavy and expensive. As a result, the weight of antennas such as DRAs can be significant, which may in turn limit the mass that is available for equipment (e.g. electrical equipment) which can negatively impact the electrical performance of the antenna.

Structural aspects of the antenna (e.g. radiating elements, signal amplification paths, structures for dissipating heat) can be significant and can require a significant physical volume, which may increase the weight of the antenna and reduce available space on a spacecraft. In spaceborne applications, the allocated overall weight for an antenna may be limited, which can limit the number of radiating elements and reduce electrical efficiency of the antenna.

Further, traditionally receive and transmit operations (e.g. in L-band and S-band, respectively) are performed using separate arrays. This approach has disadvantages, such as increasing mass and reducing available space by virtue of having separate arrays.

Accordingly, there is a need for an improved direct radiating array antenna and method of assembly that overcomes at least some of the disadvantages of existing direct radiating array antenna systems and methods.

SUMMARY

A direct radiating array ("DRA") antenna assembly is provided. The assembly includes: a support plate; a plurality of radiating element modules, wherein each of the radiating element modules includes a radiating element and a combined unit. The combined unit includes a filter assembly, a solid state power amplifier ("SSPA") and a low noise amplifier ("LNA") module, wherein a bottom surface of the combined unit is mounted to a top surface of the support/thermal plate, and wherein the radiating element is mounted to a top surface of the combined unit; and a plurality of digital boards for digital beamforming, each respective one of the plurality of digital boards having a radio frequency ("RF") connection to and servicing a subset of the radiating element modules, the plurality of digital boards mounted to a bottom surface of the support plate such that each respective one of the plurality of digital boards is located under and in proximity to the subset of the radiating element modules serviced thereby.

The DRA antenna assembly may further include a direct current ("DC") connector between the digital board and the combined unit of each of the subset of radiating element modules to power the SSPA and LNA.

The radiating element may be a dual band radiating element.

The support plate may be a thermal plate configured to receive heat from dissipative components of the DRA assembly and transport the heat away from an interior of the DRA assembly to the external thermal interfaces. The thermal plate may include a plurality of passive two-phase flow devices embedded in or mounted on the support plate.

The combined unit may be substantially within an entire footprint of the radiating element.

The plurality of digital boards may be substantially within a footprint of a radiating array formed by the plurality of radiating elements.

A direct radiating array ("DRA") antenna assembly is provided. The assembly includes: a plurality of radiating element modules, each respective one of the plurality of radiating element modules including a first dissipative component; a plurality of digital boards for digital beamforming, each respective one of the plurality of digital boards having a radio frequency ("RF") connection to and servicing a subset of the radiating element modules and including a second dissipative component; and a thermal plate having a top surface and a bottom surface, the plurality of radiating elements and the plurality of digital boards mounted to the top surface and the bottom surface, respectively, such that the first and second dissipative components are heat sunk to the thermal plate, and wherein the thermal plate includes a plurality of passive two-phase flow devices embedded therein for transporting heat received from the first and second dissipative components away from an interior of the DRA assembly.

The first dissipative component may be an amplifier unit and the second dissipative component may be a digital beamforming integrated circuit.

The passive two-phase flow device may be of various technologies such as constant or variable conductance heat pipes, pulsating heat pipes ("PHPs", or oscillating heat pipes ("OHPs"). The passive two-phase flow device may comprise a series of embedded heat pipes, pulsating heat pipes, or oscillating heat pipes.

The plurality of passive two-phase flow devices may be embedded in or mounted on the thermal plate. The plurality of passive two-phase flow devices may be embedded in the thermal plate as a plurality of flat sub-panels.

The thermal plate may comprise a weight relieved aluminum or honeycomb panel having the plurality of passive two-phase flow devices embedded therein.

The thermal plate may include first and second peripheral regions for providing a thermal exchange interface between the thermal plate and spacecraft heat pipes mounted thereto, and the thermal plate may be configured such that the plurality of passive two-phase flow devices transport the heat towards the first and second peripheral regions.

A method of assembling a direct radiating array ("DRA") antenna assembly is provided. The method includes: mounting a plurality of combined units to a top surface of a support plate, wherein each respective one of the plurality of combined units includes a filtering module and a signal amplification module, and wherein the mounting includes mounting a bottom surface of the combined unit to the top surface of the support plate; mounting a radiating element to a top surface of each respective one of the plurality of combined units, wherein the radiating element and the combined unit to which the radiating element is mounted together form a radiating element module, and wherein the mounting includes forming a first RF connection between the radiating element and the combined unit; and mounting a plurality of digital beamforming boards to a bottom surface of the support plate such that each respective one of the plurality of digital boards is located under and in proximity to a subset of the radiating element modules serviced by the digital beamforming board, and wherein the mounting includes forming a second RF connection between the digital beamforming board and the subset of radiating element modules serviced thereby.

Mounting the plurality of digital beamforming boards may further include forming a direct current (DC) connection between the digital beamforming board and the combined unit of each of the subset of radiating element modules serviced by the digital beamforming board to power the signal amplification module (e.g. SSPA and LNA).

The method may include mounting the support plate to a spacecraft bus.

The support plate may be a thermal plate configured to receive heat from dissipative components of the DRA assembly and transport the heat away from an interior of the DRA assembly using a plurality of passive two-phase flow devices embedded in or mounted on the support plate.

A method of assembling a direct radiating array ("DRA") antenna assembly is provided. The method includes: mounting a plurality of radiating elements to a top surface of a thermal plate, each respective one of the plurality of radiating elements modules including a first dissipative component and mounted such that the first dissipative component is heat sunk to the thermal plate; and mounting a plurality of digital beamforming boards to a bottom surface of the thermal plate, each respective one of the plurality of digital boards having a radio frequency ("RF") connection to and servicing a subset of the radiating element modules and including a second dissipative component, the digital beamforming board mounted such that the second dissipative component is heat sunk to the thermal plate. The thermal plate includes a plurality of passive two-phase flow devices embedded therein for transporting heat received from the first and second dissipative components away from an interior of the DRA assembly.

The first dissipative component may be an amplifier unit and the second dissipative component may be a digital beamforming integrated circuit. Dissipation from other minor sources such as harnesses may also be managed within the thermal design.

The method may include mounting the support plate to a spacecraft bus.

A system for managing heat generated by dissipative components of a direct radiating array ("DRA") antenna assembly mounted to a spacecraft bus is provided. The system includes: a thermal plate having a first subset of the dissipative components mounted to a first surface thereof and a second subset of the dissipative components mounted to a second surface thereof, the second surface opposing the first surface, the first and second subsets of the dissipative components heat sunk to the thermal plate, the thermal plate configured to transport heat received from the dissipative components towards first and second peripheral regions of the thermal plate via a plurality of passive two-phase flow devices embedded in the thermal plate; a first set of spacecraft heat pipe(s) mounted to the first surface of the thermal plate at the first peripheral region and to a thermal radiating panel; and a second set of spacecraft heat pipe(s) mounted to the first surface of the thermal plate at the second peripheral region and to the thermal radiating panel. The first and second sets of spacecraft heat pipes are configured to transport the heat received from the thermal plate to the thermal radiating panel for transfer to the environment.

The system may include four temperature gradients including a first temperature gradient between the dissipative components and the thermal plate, a second temperature gradient within the thermal plate, a third temperature gradient between the thermal plate and the first and second set spacecraft heat pipes, and a fourth temperature gradient between the first and second sets of spacecraft heat pipes and the thermal radiating panel.

The passive two-phase flow devices may be of various technologies such as constant or variable conductance heat pipes, pulsating heat pipes or oscillating heat pipes.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
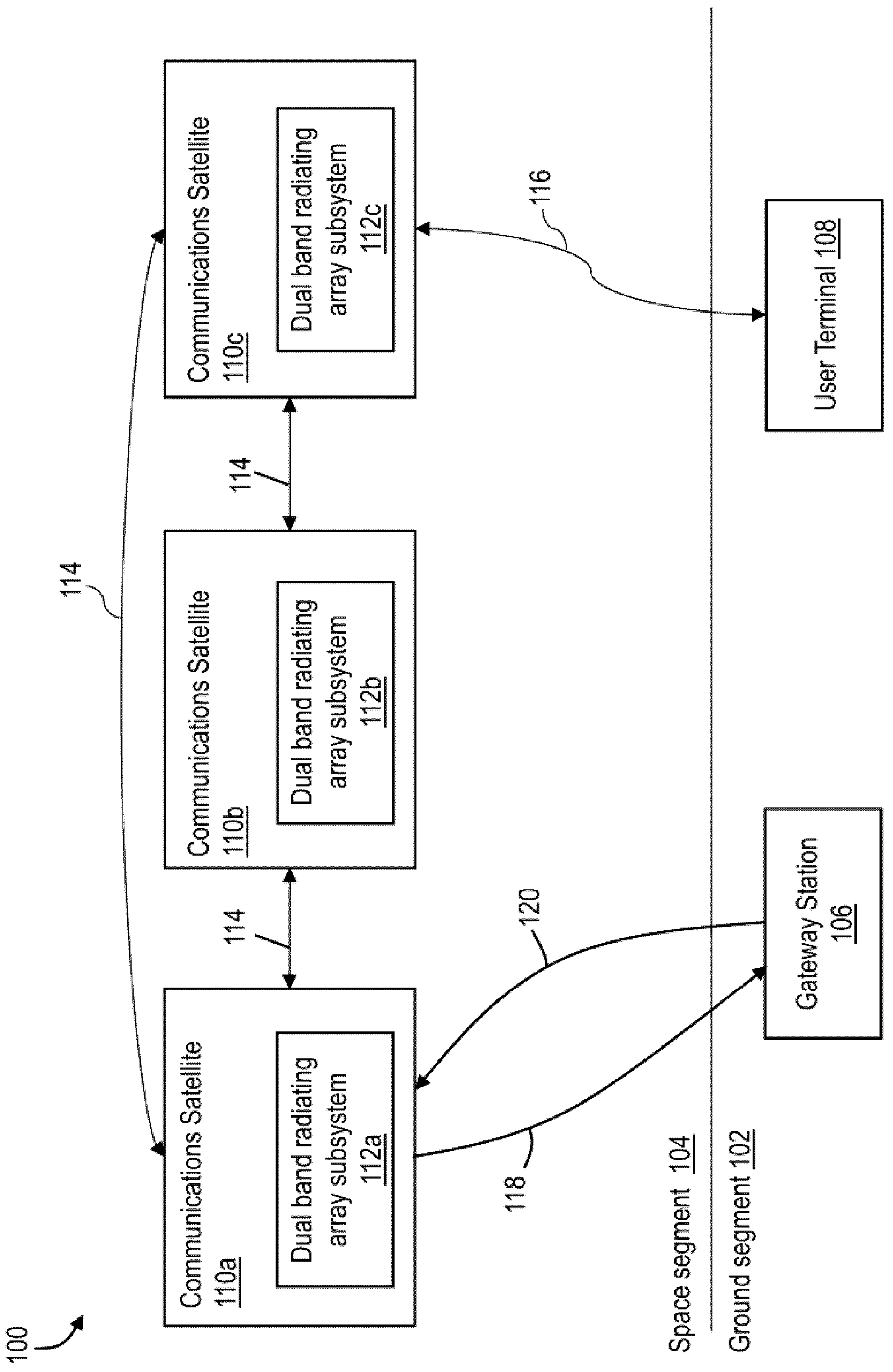
FIG. 1 is a block diagram of a satellite communication system including a plurality of satellites each having a dual band radiating array antenna subsystem, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The following relates generally to antenna-based communication systems, and more particularly to direct radiating array antennas and methods of managing heat generated thereby. The DRA assembly of the present disclosure may be a dual band radiating array antenna configured to receive an RF signal of a first predetermined signal frequency band and transmit an RF signal of a second predetermined signal frequency band. The antenna of the present disclosure may provide a more compact solution than existing approaches in which communication across multiple frequency bands is achieved through the use of a dedicated antenna for each frequency band. By implementing dual band communication using a single radiating array, the antenna of the present disclosure may advantageously reduce size, cost, and/or mass of the communication payload on the satellite, which can be a significant factor in space-based applications. Further, the compact design of the dual band array brought about by configuring the array to perform dual band communication may bring heat generating components of the antenna, such as signal amplification units (e.g. solid-state power amplifier ("SSPA"), low power amplifier ("LNA")), into a more concentrated area, making thermal management of the heat generated by the array an important feature. The dual band antenna of the present disclosure provides an assembly that is adapted to manage such thermal effects to keep component temperatures within acceptable ranges and generally uniform with respect to one another.

The present disclosure provides a direct radiating array assembly in which the radiating array (array of radiating elements), filters, amplifier units (e.g. LNA, SSPA), thermal plate and digital boards are all integrated into one compact assembly. The DRA assembly provides commonality at the digital board (e.g. PCB) and radiating element module levels. The DRA assembly provides modularity, as the assembly design is such that an individual radiating element module can be easily and quickly reworked or replaced without affecting the rest of the antenna. The DRA assembly is low profile, low mass, and modular, and provides quick change capabilities. The DRA assembly provides a self-supporting module realized by combining filters and amplifier units (e.g. SSPA and LNA) into a single unit (a "combined module" or "combined unit"), which can eliminate costly and heavy support structure for the radio frequency front end ("RFFE"). The RFFE includes the passive equipment interfacing with earth communications. The RFFE includes the radiating element and filters. The combined module includes the SSPA, LNA, and filter. The combined module also supports the radiating element. Thus, in the design of the present disclosure these components are "self-supporting" and do not need any additional support structure between the SSPA/LNA and radiating element aperture to provide physical support. The combined module serves an additional function in providing the structural support. The DRA assembly includes radiating element modules that can be easily replaced if needed by having a removable radiating element that can be removed to access connectors (e.g. bolts) attaching the radiating element module to the thermal plate. The DRA assembly has a lower structure which provides a single flat datum for excellent alignment of array elements for optimum performance.

Referring now to FIG. 1, shown therein is a system 100 for satellite-based communication, according to an embodiment.

The system 100 includes a ground segment 102 and a space segment 104.

The space segment 104 of system 100 includes communications satellites 110*a*, 110*b*, and 110*c*. Communications satellites 110*a*, 110*b*, 110*c* are referred to herein collectively as communication satellites 110 and generically as communication satellite 110.

It is to be understood that the system 100 may include any number of communication satellites 110 (i.e. one or more). In a particular embodiment, the satellite 110 is a low-earth orbit (LEO) satellite. In other embodiments, the satellite 110 may be a GEO satellite or a MEO satellite. In embodiments of the system 100 including a plurality of satellites 110, the satellites 110 may be referred to collectively as a satellite constellation or satellite network.

The communications satellites 110*a*, 110*b*, 110*c* each include a dual band radiating array subsystem (array subsystems 112*a*, 112*b*, 112*c*, respectively). Dual band radiating array subsystems 112*a*, 112*b*, 112*c* are referred to herein collectively as dual band radiating array subsystems 112 and generically as dual band radiating array subsystem 112.

The dual band radiating array subsystem 112 is configured to perform RF transmission in a first predetermined signal frequency band and RF reception in a second predetermined signal frequency band, wherein the first and second signal frequency bands do not overlap. The term "dual band" as used herein (such as to refer to the radiating array itself or to a radiating element thereof) thus refers to the ability of the radiating array antenna to transmit RF signals in a first predetermined signal frequency band ("transmit band") and receive RF signals in a second, different predetermined signal frequency band ("receive band"). The first and second signal frequency bands may correspond to designated satellite frequency bands. For example, in a particular embodiment, the array subsystem 112 may transmit RF signals in the S-band (approx. 2-4 GHz) and receive RF signals in the L-band (approx. 1-2 GHz). In another embodiment, the array subsystem 112 may receive RF signals in the S-band and transmit RF signals in the L-band. According to other embodiments, the array subsystem 112 may be scaled to transmit/receive at other frequencies provided the S/L frequency ratio is respected. In variations, the array subsystem 112 may be configured for use at frequencies lower than Ka-band. For example, the array subsystem 112 may be configured for user at C-band frequency or Ku-band frequency.

The dual band radiating array subsystem 112 includes a dual band radiating array antenna. The dual band radiating array antenna may be an active array (e.g. containing DC powered circuit, amplifiers, beamforming circuits, etc.). The dual band radiating array antenna is configured to perform digital beamforming.

Communications satellites 110*a*, 110*b*, and 110*c* communicate with one another via inter-satellite communication links 114.

The ground segment 102 includes a gateway earth station ("GES") 106 (or gateway station 106). The system 100 may include a plurality of gateway stations 106, which may be positioned at different locations.

Transmission of RF signals in a first frequency band from the gateway station 106 ("uplink") and reception of RF signals in a second frequency band at the gateway station 106 ("downlink") may be performed by different gateway stations 106 configured to operate in their respective signal frequency bands.

The gateway station 106 may be located on the surface of the Earth, in the atmosphere, or in space. The gateway station 106 may be fixed or mobile.

The gateway station 106, which may be surface-based or atmosphere-based, includes one or more devices configured to provide real-time communication with satellites 110.

The communications satellites 110 communicate with the gateway station 106 via communication downlink 118 and communication uplink 120. In FIG. 1, only communications satellite 110*a* is shown with communication links 118, 120, but it is to be understand that communications satellites 110*b*, 110*c* form similar communication links with the gateway station 106.

The gateway station 106 is configured to establish a telecommunications link 118, 120 with a satellite 110 when the satellite 110 is in "view" of the gateway station 106. The gateway station 106 transmits and/or receives radio ("RF") waves to and/or from the satellite 110. The gateway station 106 may include a parabolic antenna for transmitting and receiving the RF signals. The gateway station 106 may have a fixed or itinerant position.

The gateway station 106 sends radio signals to the satellite 110 (uplink) via communication link 120 and receives data transmissions from the satellite (downlink) via the communication link 118.

The gateway station 106 may serve as a command and control center for a satellite network (or "satellite constellation").

The gateway station 106 may analyze data received from the satellites 110 and/or may relay the received data to another location (i.e. another computer system, such as another gateway station 106) for analysis. In some cases, the gateway station 106 may receive data from the satellite 110 and transmit the received data to a computing device specially configured to perform processing and analysis on the received satellite data.

The gateway station 106 may further be configured to receive data from the satellite 110 and monitor navigation or positioning of the satellite 110 (e.g. altitude, movement) or monitor functioning of the satellite's critical systems (e.g. by analyzing data from the critical system being monitored).

The gateway station 106 may include any one or more of the following elements: a system clock, antenna system, transmitting and receiving RF equipment, telemetry, tracking and command (TT&C) equipment, data-user interface, mission data recovery, and station control center.

The ground segment 102 of system 100 also includes a user terminal 108.

The user terminal 108 may be a fixed or mobile terminal. The user terminal 108 may be any device capable of transmitting and/or receiving RF communication signals. The user terminal 108 includes an RF communication module for transmitting and/or receiving the RF signals. The user terminal 108 may be, for example, a computing device, such as a laptop or desktop, or a mobile device (e.g. smartphone).

The communications satellite 110*c* communicates with the user terminal 108 via communications link 116. Communications performed by satellite 110*c* via communications link 116 may include transmission and reception. While FIG. 1 shows communication link 116 established between the satellite 110*c* and the user terminal 108, it is to be understood that the user terminal 108 may establish a similar communication link with satellite 110*a* or 110*b*. Similarly, the communications satellite 110*c* may establish similar communication links with other user terminals.

Figure 2:
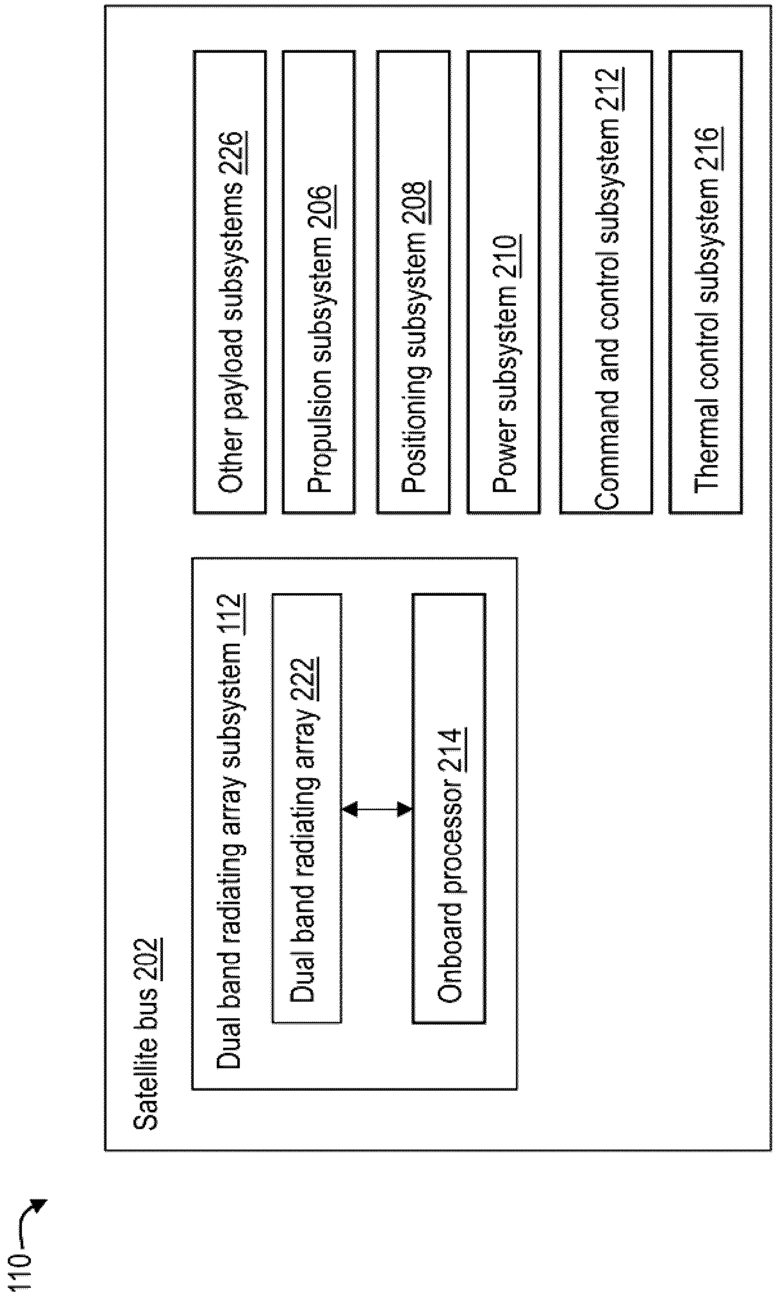
FIG. 2 is a block diagram of a communications satellite of FIG. 1, according to an embodiment.

Referring now to FIG. 2, shown therein is a communications satellite 110 of FIG. 1, according to an embodiment.

The communications satellite 110 includes a satellite bus 202. The satellite bus 202 provides the body of the satellite 110. The satellite bus 202 provides structural support and an infrastructure of the satellite 110 as well as locations for a payload (e.g. various subsystems, such as the dual band radiating array subsystem 112). Components of the communications satellite 110 may be housed within an interior of the satellite bus 202 or may be connected to an external surface of the satellite bus 202 (directly or indirectly through another component).

The communications satellite 110 includes a propulsion subsystem 206 for driving the communications satellite 110. The propulsion subsystem 206 adjusts the orbit of the satellite 110. The propulsion subsystem 206 includes one or more actuators, such as reaction wheels or thrusters. The propulsion subsystem 206 may include one or more engines to produce thrust.

The communications satellite 110 includes a positioning subsystem 208. The positioning subsystem 208 uses specialized sensors to acquire sensor data (e.g. measuring orientation) which can be used by a processing unit of the positioning subsystem 208 to determine a position of the satellite 110. The positioning subsystem 208 controls attitude and orbit of the satellite 110. The positioning subsystem 208 communicates with the propulsion subsystem 208.

Together, the positioning subsystem 208 and the propulsion subsystem 206 determine and apply the torques and forces needed to re-orient the satellite 110 to a desired attitude, keep the satellite 110 in the correct orbital position, and keep antennas (e.g. the dual band radiating array 222) pointed in the correct direction.

The communications satellite 110 includes an electrical power subsystem 210. The electrical power subsystem 210 provides power for the dual band array subsystem 112, as well as for other components. The power may be provided through the use of solar panels on the satellite bus 202 that convert solar radiation into electrical current. The power subsystem 210 may also include batteries for storing energy to be used when the satellite 110 is in Earth's shadow.

The communications satellite 110 includes a command and control subsystem 212. The command and control subsystem 212 includes electronics for controlling how data is communicated between components of the communications satellite 110. The propulsion subsystem 206, the positioning subsystem 208, and the power subsystem 210 may each be communicatively connected to the command and control subsystem 212 for transmitting data to and receiving data from the command and control subsystem 212.

The communications satellite 110 also includes a thermal control subsystem (or thermal management subsystem) 216. The thermal control subsystem 216 controls, manages, or regulates the temperature of one or more components of the communications satellite 110, such as signal amplification units of the radiating element module, within acceptable temperature ranges, which may include maintaining similar components at a generally uniform temperature. For example, the thermal control subsystem 216 may manage the temperature of components of the subsystem 112 by managing heat generated by active heat sources (heat generating components) thereof. Generally, the thermal control subsystem 216 protects electronic equipment of the dual band array subsystem 112 from extreme temperatures due to self-heating of the dual band array subsystem 112 (e.g. by operation of the signal amplification components or digital beamforming boards of the dual band array subsystem). The thermal control subsystem 216 may include active components or passive components.

The communications satellite 110 may also include other payload subsystems 226. The other payload subsystems 226 may include any one or more of optical intersatellite terminals, gateway antennas, filters, cables, waveguides, etc.

The communications satellite 110 includes a dual band array subsystem 112. The dual band array subsystem 112 includes a dual band radiating array 222 and an onboard processor ("OBP") 214. The dual band radiating array 222 is communicatively connected to the OBP 214. The OBP 214 may be part of the satellite's payload.

The OBP 214 performs the digital beamforming (Rx and Tx digital beamforming) and channelization. On the forward link, the signal received is digitized, the channels are demultiplexed and sent to the processor for beamforming, conversion to analog and distribution to the transmit antenna elements. On the return link, the signals received from the receive antenna elements are digitized, subchannels are demultiplexed and beams are formed by the processor. The obtained beam signals are multiplexed, converted to analog and sent to the downlink.

The digital beamforming operations performed by the OBP 214 allow for the array of dual band RF radiating elements to be steered to transmit RF signals in a specific direction and minimize radiated power in other directions (the antenna can null certain directions to prevent interference). Each radiating element in the array may be fed separately with the signal to be transmitted. The phase, and possibly the amplitude, of each signal is then added constructively and destructively in such a way that the energy is concentrated into a narrow beam or lobe and minimized in other directions. Controlling the amplitude may be optional in some designs.

The dual band array 222 is both a receive (Rx) antenna and a transmit (Tx) antenna. In variations, the communications satellite 110 may have a plurality of dual band array assemblies 222 or dual band array subsystems 112. The number of dual band array subsystems 112 or dual band array assemblies on the communications satellite 110 is not particularly limited.

The dual band array 222 transmits an electromagnetic RF signal within a first predetermined signal frequency band and receives an electromagnetic RF signal within a second predetermined signal frequency band. The dual band array assembly may be configured to use a subset of the overall signal frequency band.

Figure 3:
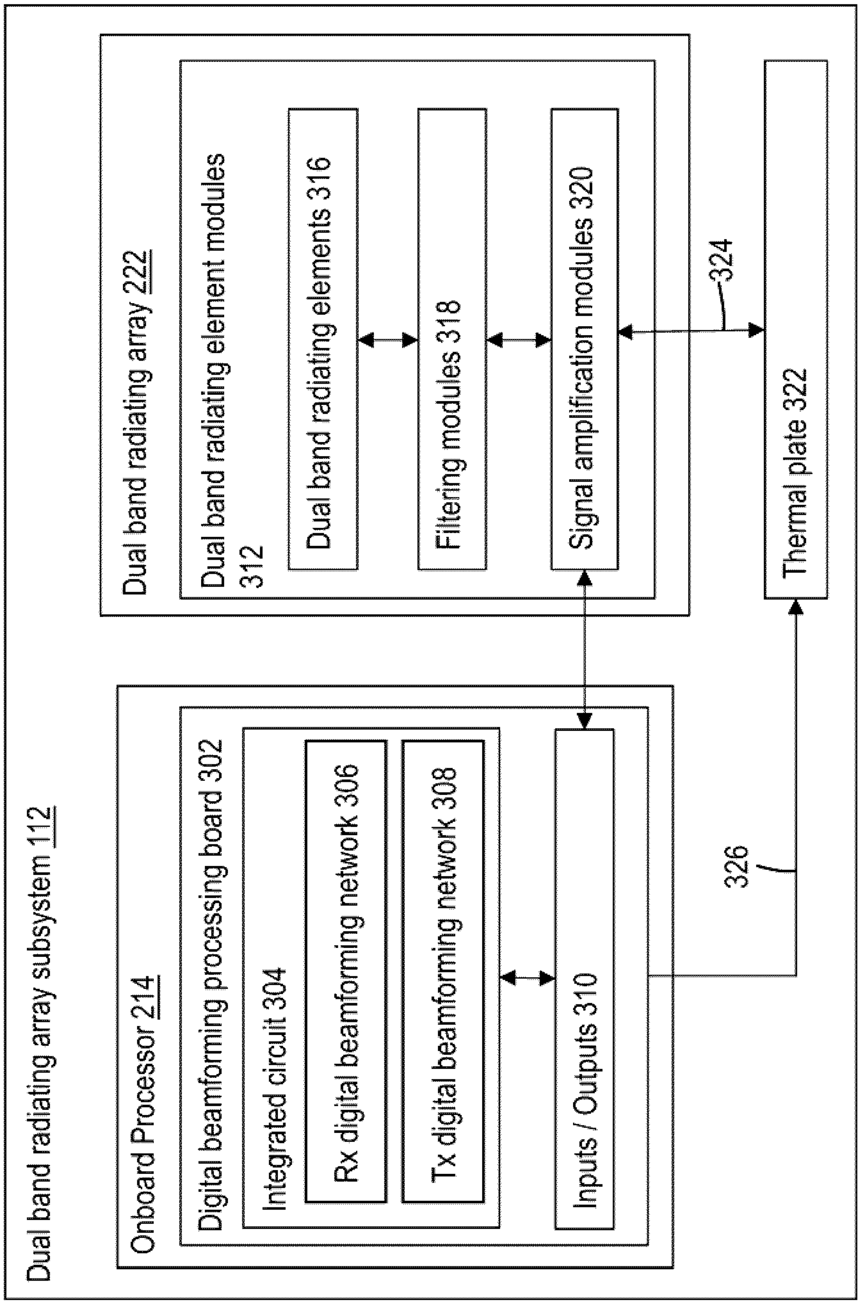
FIG. 3 is a block diagram of the dual band array subsystem of FIG. 2, according to an embodiment.

Referring now to FIG. 3, shown therein are the dual band array 222 and OBP 214 of FIG. 2 in greater detail, according to an embodiment.

Generally, the dual band radiating array 222 is a phased array antenna including a collection of antenna or radiating elements 316 (described below) assembled together such that the radiation pattern of each individual radiating element 316 constructively combines with neighboring radiating elements 316 to form an effective radiation pattern called a main lobe. The main lobe transmits radiated energy in a desired location while the dual band array is designed to destructively interfere with signals in undesired directions, forming nulls and side lobes. The dual band array subsystem 112 may be designed to maximize the energy radiated in the main lobe while reducing energy radiated in the side lobes to an acceptable level. The direction of radiation may be manipulated by changing the phase of the signal fed into each radiating element 316. The result is that each radiating element 316 in the array 222 has an independent phase and amplitude setting to form a desired radiation pattern.

The dual band array 222 includes a plurality of radiating element modules 312. Each radiating element module 312 includes a radiating element 316 for transmitting and receiving RF energy, a filtering module 318 for filtering RF signals, and a signal amplification module 320 for performing signal amplification on RF signals.

Each radiating element 316 is a basic subdivision of the antenna 222, which is itself capable of radiating or receiving RF energy.

The radiating element 316 is a dual band radiating element capable of transmitting an RF signal of a first frequency band and receiving an RF signal of a second frequency band.

The radiating element 316 may be a dual band self-circular polarizing (self-CP) patch radiating element. The self-CP radiating element is designed to transform a signal from linear to circular polarization without the need for a separate polarizer. This may advantageously eliminate the cost, mass, and volume of polarizers. The user on ground receives and transmits a circularly polarized signal, so the self-CP radiating element enables the antenna to communicate with the user.

In an embodiment, the radiating element 316 includes a first radiating patch and a second radiating patch. The first radiating patch is configured to transmit an RF signal of a first signal frequency band (e.g. S-band). The second radiating patch is configured to receive an RF signal of a second signal frequency band (e.g. L-band). The first and second radiating patches may configured be in a stacked patch configuration, wherein one radiating patch (e.g. first radiating patch) is disposed on top of the other radiating patch (e.g. second radiating patch). For example, in an embodiment, the first radiating patch (Rx) may be used as the ground plane for the second radiating patch (Tx).

The radiating element 316 includes an input connection and output connection for receiving RF signals from and transmitting RF signals to the filtering module 318, respectively.

The filtering module 318 includes a receive filter unit and a transmit filter unit for filtering Rx and Tx RF signals, respectively. The filtering module 318 includes input and output connections for receiving RF signals from and transmitting RF signals to the radiating element 316. The filtering module 318 also includes input and output connections for receiving RF signals from and transmitting RF signals to the signal amplification module 320.

The signal amplification module 320 includes an Rx signal amplification unit (e.g. low noise amplifier or "LNA") and a Tx signal amplification unit (e.g. solid-state power amplifier or "SSPA") for performing signal amplification on Rx and Tx signals, respectively.

The signal amplification module 320 includes input and output connections for receiving filtered signals from and transmitting signals (to be filtered) to the filtering module 318. The signal amplification module 320 routes filtered signals received from the filtering module 318 to the Rx amplification unit for amplification. The signal amplification module 320 routes amplified Tx signals from the Tx amplification unit to the filtering module 318.

The signal amplification module 320 also includes input and output connections for receiving signals (for amplification) from and transmitting amplified signals to the digital processing board (described further below) to which the radiating element module 312 is connected. The signal amplification module 320 is thus configured to route signals received from the digital processing board to the Tx amplification unit for signal amplification and to route amplified Rx signals from the Rx amplification unit to the digital processing board.

The OBP 214 includes one or more digital processing boards 302. FIG. 3 illustrates a representative digital beamforming processing board 302 but it is to be understood that in variations of the dual band array subsystem 112, the OBP 214 includes a plurality of digital beamforming processing boards 302 and the number of digital processing boards 302 is not particularly limited. In an embodiment with one digital processing board 302, each of the radiating elements 316 in the array 222 is connected to and serviced by the digital processing board 302. In embodiments using a plurality of digital processing boards 302, each of the digital beamforming processing boards is connected to and services a subset of the total number of radiating elements 316 in the array 222. The subsystem 112 may be configured such that each of the plurality of digital processing boards 302 is communicatively connected to and services the same (or approximately the same) number of radiating elements 316. The number of digital beamforming processing boards 302 in the subsystem 112 may be determined based on the number of input and output ports available on the digital processing board 302 (which would limit the number of radiating elements 316 that can be connected to the board 302).

Each digital beamforming processing board 302 may have a "prime" digital processing board and a "redundant" digital processing board (which is, in effect, a duplicate of the prime).

Digital boards 302 may be distributed as tiles with each board configured to service a subset of the radiating elements 316 (receive and transmit). This configuration of digital processing boards 302 may advantageously simplify beamforming complexity of the array and interconnectivity within the array.

The digital processing board 302 includes an integrated circuit 304. In an embodiment, the integrated circuit 304 is a field programmable gate array ("FPGA"). The integrated circuit 304 includes an Rx digital beamforming network 306 and a Tx digital beamforming network 308. The digital beamforming networks 306, 308 perform digital beamforming operations for Rx and Tx operations, respectively.

The digital processing board 302 also includes a plurality of input connections and output connections 310. The inputs/outputs 310 facilitate communication between the digital processing board 302 and the radiating element modules 312. In particular, the inputs/outputs 310 include an output connection for routing an output of the Tx beamforming network 308 to the signal amplification module 320 of the radiating element module 312 and an input connection for receiving an amplified Rx signal from the signal amplification module 320 and routing the Rx signal to the Rx digital beamforming network 306 for signal processing.

In some cases, the digital processing board 302 may receive beamforming information (e.g. partial beamforming information) from or provide beamforming information to another digital processing board 302 in the subsystem 112. The OBP 214 may thus be configured to perform distributed digital beamforming using multiple digital processing boards 302.

The radiating array subsystem 112 also includes a thermal plate 322. The thermal plate 322 is disposed between the signal amplification modules 320 of the radiating array 222 and the digital beamforming processing boards 302 of the OBP 214 for receiving heat 324, 326 generated thereby. For example, the signal amplification modules 320 and digital processing boards 302 may be mounted to opposing sides of the thermal plate 322. The thermal plate 322 is adapted to transfer heat generated by heat generating components of the array subsystem 112 (e.g. integrated circuits 304, signal amplification modules 320) away from the center of the array 222 and towards the sides.

In an embodiment, the thermal plate 322 includes a panel of material having good thermal conductivity (thermally conductive material). The thermal plate 322 also includes a plurality of passive two-phase flow devices (two-phase thermal control devices) such as heat pipes, pulsating heat pipes and oscillating heat pipes ("OHP"). The passive two-phase flow devices may comprise a series of embedded heat pipes, pulsating heat pipes, or oscillating heat pipes. The passive two-phase flow devices may be embedded in the thermal plate 322 (e.g. embedded in the panel) or mounted on the thermal plate 322.

The thermal plate 322 includes a surface onto which spacecraft heat pipes can be mounted to provide a thermal interface for heat exchange from the thermal plate 322 to the spacecraft heat pipes.

Figure 4:
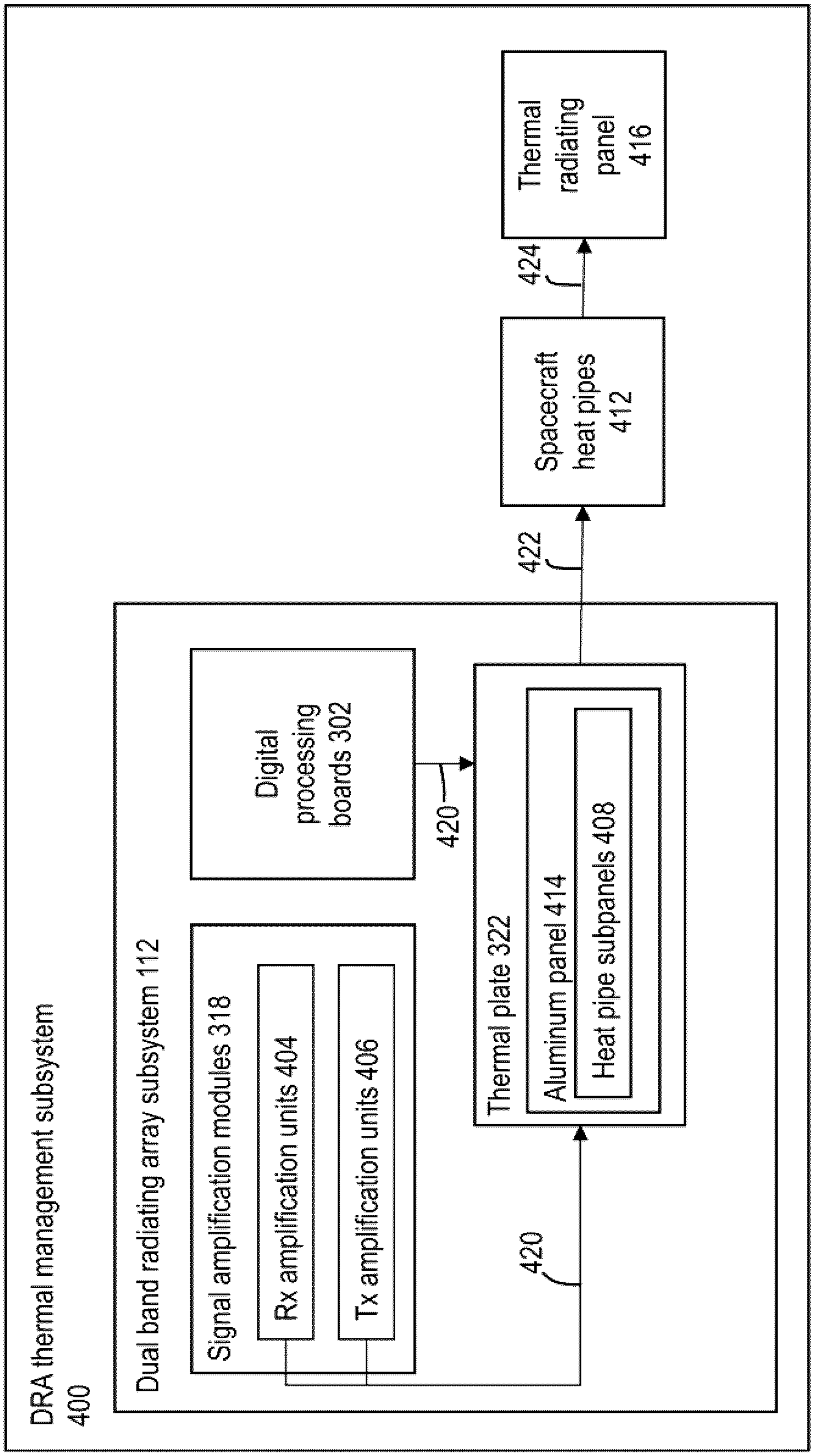
FIG. 4 is a block diagram of a thermal management subsystem for the dual band radiating array subsystem of FIG. 3, according to an embodiment.

Referring now to FIG. 4, shown therein is a DRA thermal management subsystem 400, according to an embodiment. The thermal management subsystem 400 is designed to manage heat generated by the dual band radiating array subsystem 112 of FIG. 1. The DRA thermal management subsystem 400 may be implemented, for example, on communications satellite 110 of FIG. 1 or satellite bus 202 of FIG. 2. The thermal management subsystem 400 manages major sources of heat dissipation in the DRA subsystem 112, such as amplifier units (e.g. SSPA, LNA) and digital beamforming integrated circuits, and may also manage minor sources of heat dissipation in the DRA subsystem 112 such as harnesses.

The DRA thermal management subsystem 400 includes thermal plate 322. The thermal plate 322 is a component of the DRA subsystem 112. The thermal plate 322 is generally adapted to draw heat from the DRA, and in particular from the center or internal parts of the DRA (i.e. where radiating element modules are concentrated), and transport the heat outwards away from the DRA and towards the sides/ends of the thermal plate 322 where the heat can be further transported and dissipated using thermal management infrastructure of the spacecraft. In doing so, the thermal plate 322 serves to maintain temperatures of the DRA subsystem 112 and its heat generating components at acceptable levels and at a generally uniform temperature relative to one another. In a preferred embodiment, the thermal plate 322 comprises a single continuous plate. In other embodiments, the thermal plate 322 may include multiple smaller plates or sub-pieces (sub-plates) which together form the thermal plate 322. For example, the thermal plate 322 may include two separate thermal plates (sub-plates of the thermal plate 322) to transport heat to the existing spacecraft heat pipes on either side of the DRA. This is not a preferred approach, however, as it can unnecessarily reduce the mechanical stiffness and integrity afforded by one continuous thermal plate and can result in greater performance degradation should there be a failure in one of the sub-plates. The faulty sub-plate may then not share its thermal load with the other sub-plate and may overheat, resulting in a failure of the electronics over time.

The thermal plate 322 includes an aluminum panel 414. In other embodiments, the panel 414 may be composed of another material provided the material meets certain criteria, such as having a suitable strength, thermal performance (e.g. adequate or sufficient thermal conductivity), and compatibility with the coefficient of thermal expansion ("CTE") of other equipment. Aluminum may be selected as the preferred material for panel 414 by virtue of its optimal balance of cost, mass, strength, thermal performance, and compatibility with the CTE of other equipment. The aluminum panel 414 may be a weight relieved aluminum panel structure. The aluminum panel 414 may have a honeycomb construction. The aluminum panel 414 may provide the basic structure of the thermal plate 322. The aluminum panel 414 may be highly weight relieved and machined. Weight may be relieved from the aluminum panel 414 using machining of pockets with ribs to remove useless mass. This approach may be used to reduce antenna mass (preventing it from being excessive). Reducing mass of the aluminum panel 414 in this way can positively impact that number of spacecrafts that can be launched on one rocket (or, conversely, failure to do so may negatively impact the number of spacecrafts launchable per rocket). Weight relieving of the aluminum panel 414 creates an adequately stiff, strong, and thermally conductive structure with minimal mass at a reasonable cost.

The thermal plate 322 also includes a plurality of heat pipe (e.g. PHP) subpanels 408 embedded in the aluminum panel 414. The heat pipe subpanels 408 may be embedded heat pipes of flat PHP or OHP subpanels. In an embodiment, the thermal plate 322 may include a plurality of heat pipes embedded within a machined thermal panel 414 with close-out panels.

The thermal plate 322 may also include one or more close-out panels attached to the aluminum panel 414. The close out panels may provide a rigid and light weight closed box structure to the thermal plate 322. The construction of the thermal plate 322 may include a highly weight relieved/machined aluminum plate on both sides including a plurality of pockets and flat OHPs bonded into the pockets provided within the thermal plate 322. The installed or embedded OHPs and any open pockets in the aluminum panel 414 can be covered or closed out by bonding on thin machined covers or close-out panels.

The heat pipe subpanels 408 each include one or more heat pipes. The number and position/location of the heat pipes in the heat pipe subpanels 408 may be driven by the amount and distribution of power that is dissipated and which needs to be removed by the heat pipes. The heat pipes may be adapted to transfer heat actively or passively. The heat pipe may be a passive heat pipe for performing passive cooling. The heat pipe may be an oscillating heat pipe (or "pulsating heat pipe"). The pulsating heat pipe ("PHP") may be a conventional pulsating heat pipe. The heat pipe may act as a heat transfer device that combines the principles of thermal conductivity and phase transition to effectively transfer heat between two solid interfaces. In an embodiment, at the hot interface of the heat pipe, a liquid in contact with a thermally conductive solid surface turns into a vapor by absorbing heat from that surface. The vapor then travels along the heat pipe to the cold interface and condenses back into a liquid, releasing the latent heat. The liquid then returns to the hot interface through capillary action and the cycle repeats.

The heat pipe of the heat pipe subpanels 408 may include a sealed pipe or tube made of a material that is compatible with a working fluid. In the case of an pulsating heat pipe, the heat pipe may be only partially filled with liquid working fluid. The pulsating heat pipe may be arranged in a serpentine pattern in which freely moving liquid and vapor segments alternate. Pulsation takes place in the working fluid and the pipe remains motionless.

The thermal plate 322 receives and transports heat from heat generating components (dissipative components) of the DRA subsystem 112 such as the signal amplification module 318 and the digital processing boards 302. The transfer of heat from components 318, 302 is denoted by heat transfer path 420. The signal amplification module 318 includes an Rx amplification unit 404 (e.g. first frequency band amplification unit) and a Tx amplification unit 406 (e.g. second frequency band amplification unit) which are the main dissipative components of the signal amplification module 318. Each signal amplification module 318 and digital board 302 may be mounted to the thermal plate 322 to provide respective thermal exchange interfaces for the transfer of heat from the dissipative components 404, 406, 302 to the thermal plate 322. In an embodiment, the signal amplification modules 318 and the digital boards 302 are mounted to opposing surfaces of the thermal plate 322 (e.g. top and bottom surfaces). The thermal plate 322 may also provide a support structure for the DRA subsystem 112 by facilitating mounting of the signal amplification modules 318 (and, thus, the radiating element modules 312) and the digital processing boards 302 thereto.

The DRA thermal management subsystem 400 also includes spacecraft heat pipes 412. The spacecraft heat pipes 412 function as heat transfer intermediaries between the thermal plate 322 and a thermal radiating panel (e.g. thermal radiating panel 416, described below).

Figure 14:
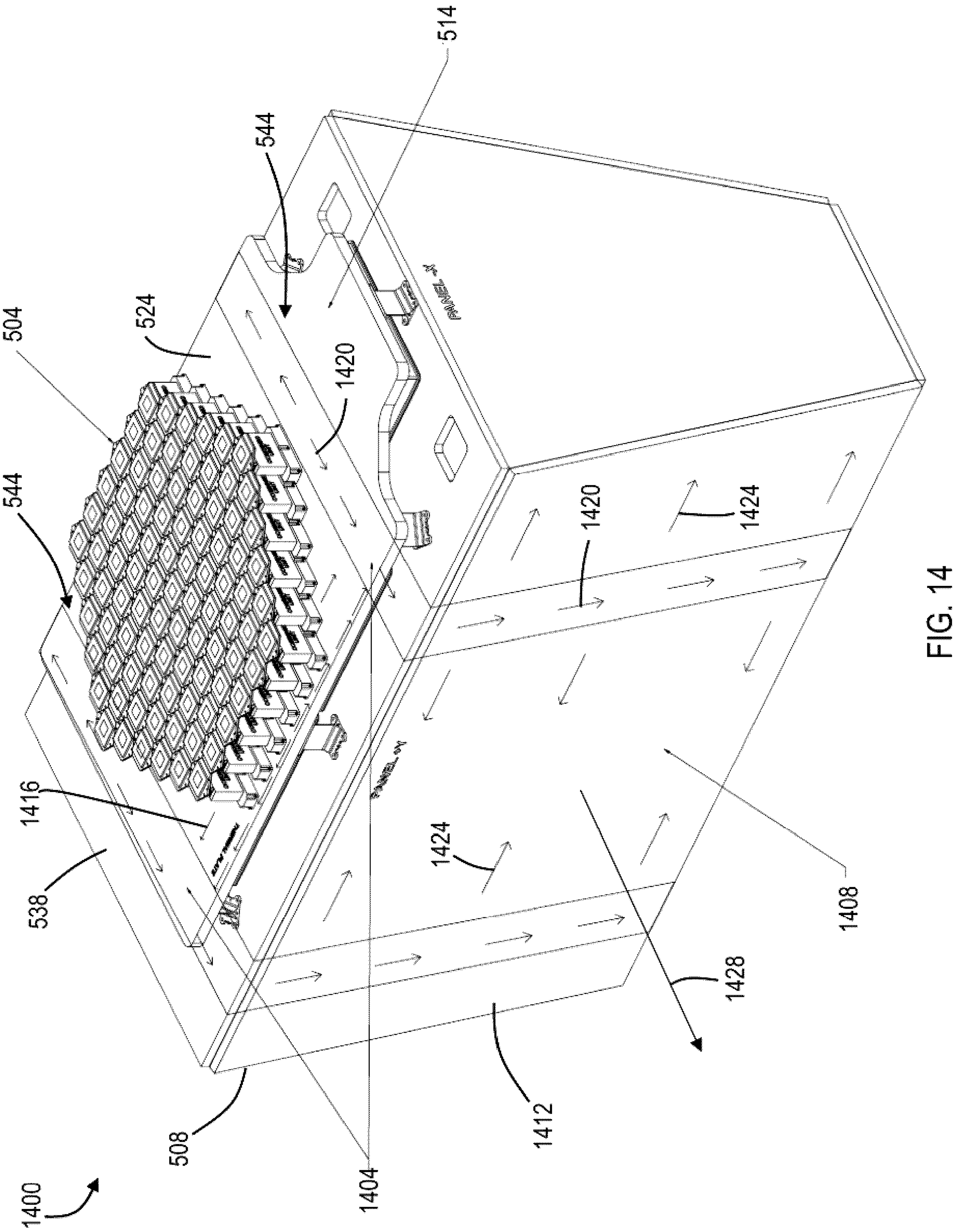
FIG. 14 is a top perspective view of the DRA assembly and spacecraft bus of FIG. 5A further including spacecraft heat pipes mounted to the DRA assembly and illustrating heat flow from the thermal plate of the DRA assembly to the spacecraft heat pipes and to a radiative panel of the spacecraft bus for heat dissipation, according to an embodiment.

The spacecraft heat pipes 412 are mounted to a surface of the thermal plate 322. In an embodiment, spacecraft heat pipes 412 are mounted to both sides of the DRA so as to receive and transport heat that has been drawn out of the center of the DRA and towards the sides (i.e. in opposing directions) by the thermal plate 322. Mounting of the spacecraft heat pipes 412 to the thermal plate 322 creates a first thermal exchange interface of the DRA thermal management subsystem 400 between the thermal plate 322 and spacecraft heat pipes 412. The first thermal exchange interface may be on a top surface of the thermal plate 322. For example, the spacecraft heat pipes 412 may be directly mounted to a top surface of the thermal plate 322, where the top surface provides the thermal exchange interface between the thermal plate 322 and the spacecraft heat pipes 412. The number of spacecraft heat pipes 412, the mounting locations of the spacecraft heat pipes 412 on the top surface, and the number of mounting interfaces may vary. In an embodiment, spacecraft heat pipes 412 are mounted on the top surface of the thermal plate at first and second opposing sides of the array such as shown in FIG. 14.

The thermal plate 322 transfers heat from the heat generating units 404, 406, 302 to the spacecraft heat pipes 412 along heat dissipation path 422. The spacecraft heat pipes 412 may function similarly to the thermal plate 322 (e.g. heat pipe functionality) with respect to heat transfer/exchange. Heat exchange between the thermal plate 322 and the spacecraft heat pipes 412 occurs through conduction.

The DRA thermal management subsystem 400 also includes a thermal radiating panel 416. The thermal radiating panel 416 may be mounted to or otherwise form all or a portion of an external surface of the body on which the DRA subsystem 112 is mounted (e.g. spacecraft bus). For example, the thermal radiating panel 416 may be present on a side surface of the spacecraft bus. The thermal radiating panel 416 may be a spacecraft panel or a flat plate radiator mounted to a spacecraft. The spacecraft panel may be a structural spacecraft panel or may be a panel deployed once the spacecraft is in orbit.

The spacecraft heat pipes 412 are mounted to the thermal radiating panel 416, creating a second thermal exchange interface of the DRA thermal management subsystem 400 between the spacecraft heat pipes 412 and the thermal radiating panel 416.

The thermal radiating panel 416 receives heat from the spacecraft heat pipes 412 via the second thermal exchange interface. The transfer of heat from the spacecraft heat pipes 412 to the thermal radiating panel 416 is denoted by heat dissipation path 424.

The thermal radiating panel 416 rejects or transfers received heat to the environment (e.g. space). The thermal radiating panel 416 may reject heat by infrared radiation from a surface of the thermal radiating panel 416.

Referring now to FIGS. 5A to 5D (collectively referred to as "FIG. 5"), shown therein are a perspective view 500*a*, front view 500*b*, top view 500*c*, and close-up partial perspective view 500*d*, respectively, of a DRA assembly 504 mounted to a spacecraft bus 508, according to an embodiment. The DRA assembly 504 may be the dual band radiating array subsystem 112 of FIGS. 1 to 4.

The DRA assembly 504 is a dual band radiating array antenna. The DRA assembly 504 is configured to receive an RF signal of a first predetermined signal frequency band and transmit an RF signal of a second predetermined signal frequency band. In the example of DRA assembly 504, the first signal frequency band is the L-band and the second signal frequency band is the S-band. In variations of the DRA assembly 504, other signal frequency bands may be used.

The DRA assembly 504 includes a radiating array 510, a thermal plate 514, and a plurality of digital processing board assemblies 518. The thermal plate 514 is also a support plate, providing structural support for the DRA assembly 504 by having components of the DRA assembly 504 mounted thereto. The digital processing board assemblies 518 include digital beamforming board assemblies (denoted "518") and a c-band digital board assembly (denoted "518*c*"). The radiating array 510, thermal plate 514, and digital processing boards 518 may be the radiating array 222, thermal plate 322, and digital processing boards 302, respectively, of FIGS. 3 and 4.

The radiating array 510 includes a plurality of radiating element modules 522 mounted to a top surface 524 of the thermal plate 514.

Each radiating element module 522 includes a radiating element 526, a filtering module 528, and a signal amplification module 530. The signal amplification modules 530 are mounted to the top surface 524 of the thermal plate 514 via connectors 532. Each filtering module 528 is mounted to a signal amplification module 530. Each radiating element 526 is mounted to a filtering module 528 via connectors 534. The arrangement and design of the radiating element modules 522 provides a level of modularity to the DRA assembly 504.

Figure 6:
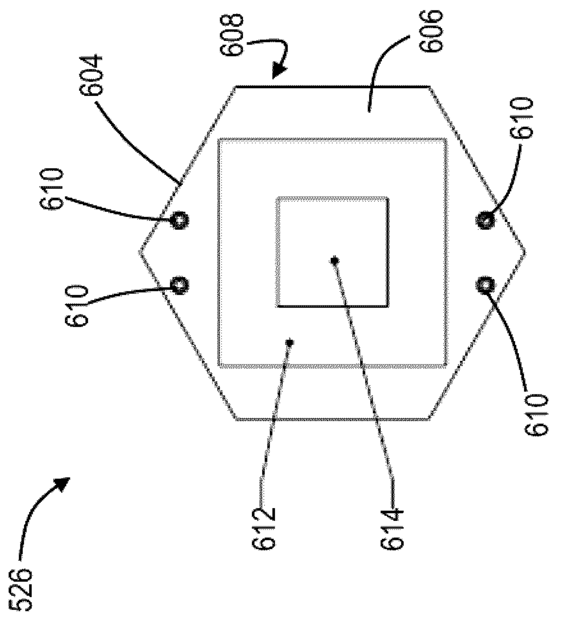
FIG. 6 is a top view of an dual band radiating element of the DRA assembly of FIGS. 5A to 5D in isolation, according to an embodiment.

Referring now to FIG. 6, shown therein is a radiating element 526 in isolation, according to an embodiment. The radiating element 526 is a dual band radiating element capable of receiving an L-band RF signal and transmitting an S-band RF signal.

The radiating element 526 includes a baseplate 604. The baseplate 604 may be composed of aluminum. The baseplate 604 includes a top surface 606 and a bottom surface 608 opposing the top surface 606.

The baseplate 604 is mounted to a filtering module 528 via the bottom surface 608. The baseplate 604 includes holes for receiving connectors 610 therethrough for connecting the baseplate 604 to the filtering module 528. The connector 610 may be a fastener, such as a bolt, screw, or the like. The connectors 616 (and the holes in the baseplate 604 through which they are received) enable the radiating element 526 to be connected and disconnected from the filtering module (and thus the radiating element module 522 and array assembly 504), making the radiating element 526 modular and removable from the DRA assembly 504 (as shown in FIG. 5D).

The radiating element 526 includes a first radiating patch 612 and a second radiating patch 614 disposed on the top surface 606 of the baseplate 604. The first radiating patch 612 is an L-band radiating patch and the second radiating patch 614 is an S-band radiating patch. While the patches 612, 614 are shown as rectangles, this is merely one example and other shapes are contemplated.

The radiating element 526 further includes a first patch connector and a second patch connector (not shown) disposed on the bottom surface 608 of the baseplate for connecting to respective RF interfaces on the filtering module 528 to which the radiating element 526 is connected. The first patch connector is an L-band connector for passing an RF signal received from the first radiating patch 612 to the filtering module to which the radiating element 600 is connected. The second patch connector is an S-band connector for passing an RF signal from the filtering module 528 to which the radiating element 600 is connected to the second radiating patch 614 for transmission by the second radiating patch 614.

Referring now to FIGS. 7A to 7D, shown therein are a top view 700*a*, a front view 700*b*, a cross-sectional side view 700*b* (taken along line C-C of FIG. 7B), and a bottom view 700*d*, respectively, of filtering module 528 and signal amplification module 530 components of the radiating element module 522 of FIG. 5, according to an embodiment. The filtering module 528 and signal amplification modules 530 may be collectively referred to as a combined unit 702 (i.e. the combined unit 702 includes the filtering module 528 and the signal amplification module 530).

The filtering module 528 includes a filter housing 706.

The filtering module 528 includes mounting points 708 disposed on a top surface 710 of the filter housing 706.

The mounting points 708 are used to mount the radiating element 526 to the top surface 710 of the filter housing 706. The mounting points 708 may comprise cylindrical members extending vertically from the top surface 710. In particular, the mounting points 708 may be adapted to receive the connectors 610 of the radiating element 526, thereby connecting the radiating element 526 to the filtering module 528. While four mounting points 708 are illustrated, the number of mounting points and their location on the top surface 706 are not particularly limited.

The filtering module 528 also includes first and second RF interfaces 712, 714 for connecting to the radiating element 526. The first RF interface 712 is an L-band (Rx) RF interface which connects to first (L-band) patch connector of the radiating element module 526. The second RF interface 714 is an S-band (Tx) RF interface which connects to the second (S-band) patch connector of the radiating element module 526.

Figure 7A:
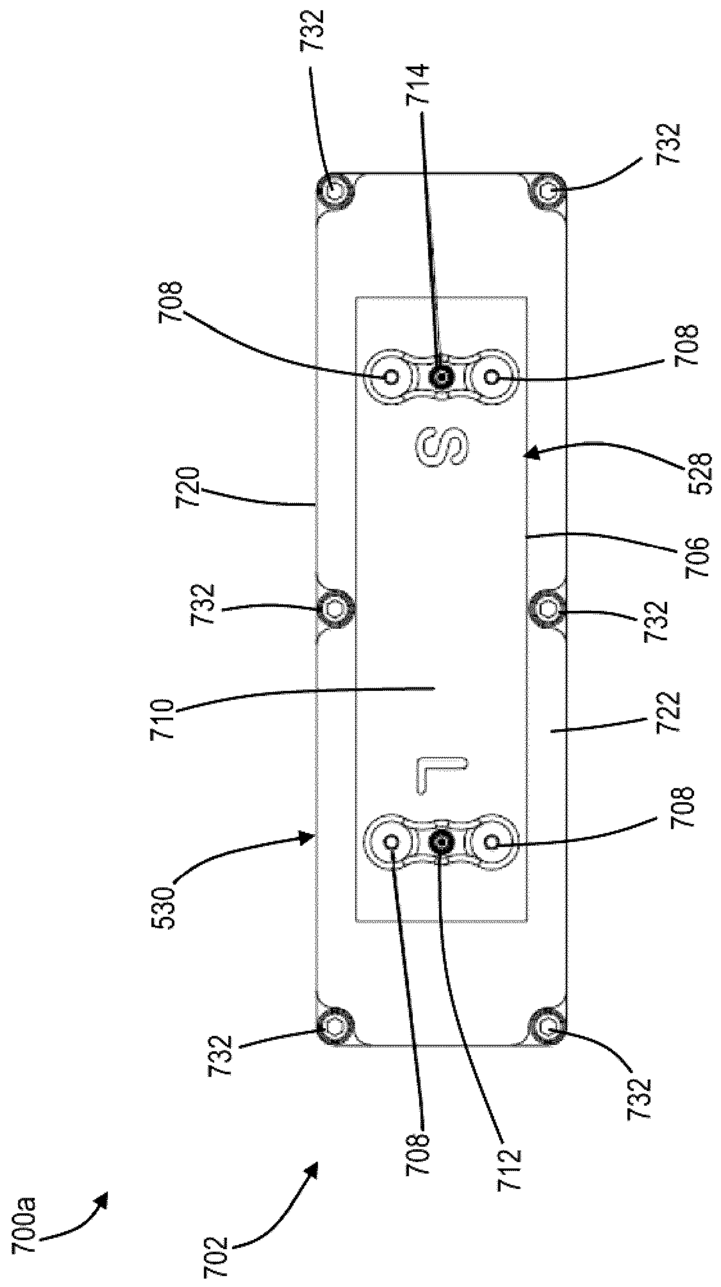
FIG. 7A is a top view of a filtering module and signal amplification module of the DRA assembly of FIGS. 5A to 5D, in isolation.
Figure 7B:
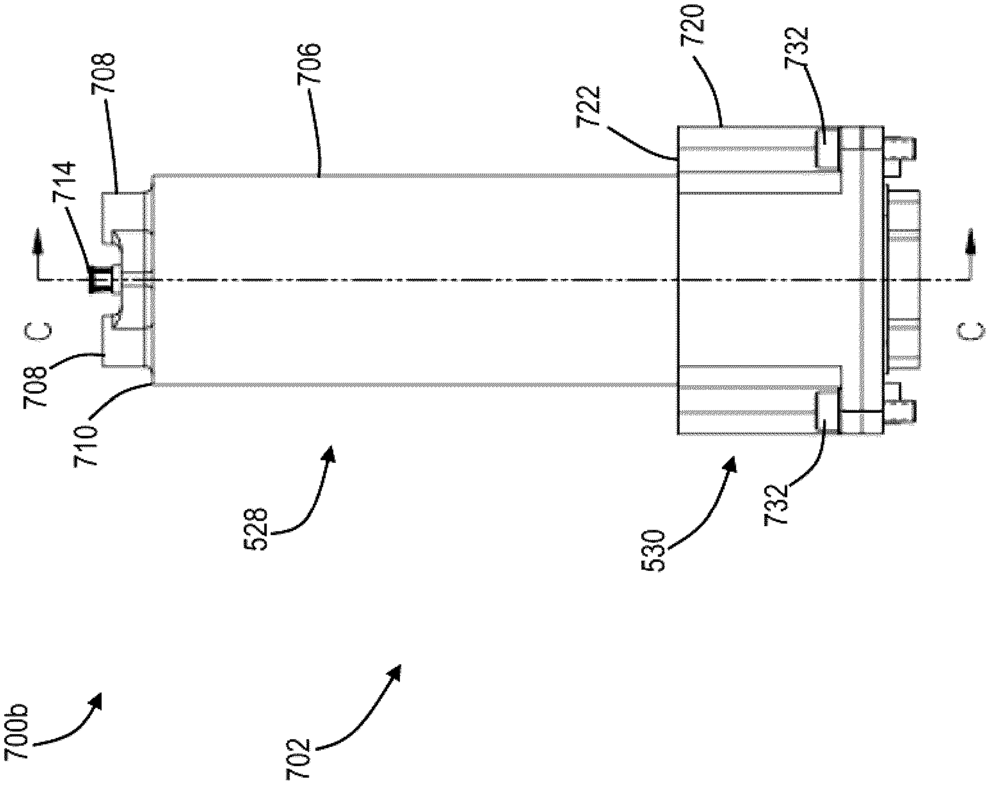
FIG. 7B is a front view of the filtering module and signal amplification module of FIG. 7A.
Figure 7C:
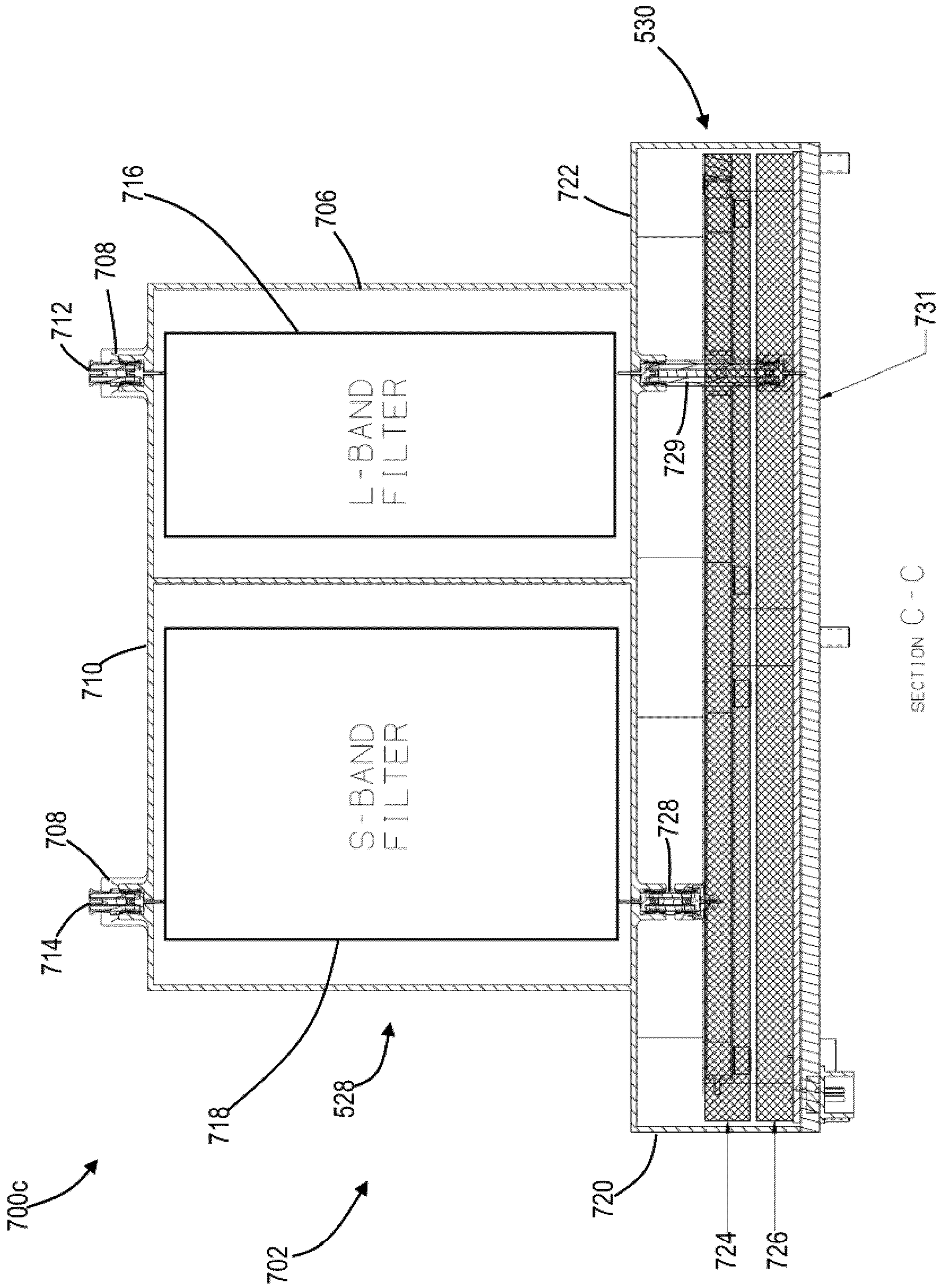
FIG. 7C is a cross-sectional view of the filtering and signal amplification modules taken along line C-C of FIG. 7B.

The first and second RF interfaces 712, 714 extend through the top surface 710 into an interior of the filter housing 706 containing a first (L-band) filter unit 716 and a second (S-band) filter unit 718 for filtering Rx and Tx RF signals, respectively (shown in FIG. 7C). In particular, the first RF interface 712 connects to the first filter unit 716 and the second RF interface 714 connects to the second filter unit 718.

Referring now to the signal amplification module 530, the signal amplification module 704 includes a housing 720. The housing 720 includes a top surface 722 on which the filtering module 702 is disposed. The filter housing 706 and amplifier housing 720 may be physically separate housings with the filter housing 706 mounted onto the top surface 722 of the amplifier housing 720. In other cases, the filter housing 706 may be integrally formed with the amplifier housing 720.

The signal amplification module 530 includes a low noise amplifier printed circuit board ("LNA PCB") 724 and a solid-state power amplifier PCB ("SSPA PCB") 726 disposed within an interior of the amplifier housing 720.

The combined unit 702 includes RF connections 728, 729 between the filters 716, 718 in the filtering module 528 and their corresponding SSPA (on SSPA PCB 726) and LNA (on LNA PCB 724).

The amplifier housing 720 further includes a base plate 730. The base plate 730 provides a mounting interface for mounting the signal amplification module 530 (and thus the radiating element module 522) to the top surface 524 of the thermal plate 514. The base plate 730 also comprises a thermal interface with the thermal plate 514 when mounted thereto. The base plate 730 may be an aluminum plate. The amplifier may be bonded to a top surface of the base plate 730. The amplifier may be bonded to the base plate 730 using a thin layer of thermally conductive paste. The thermally conductive paste promotes contact and a thermal path over life to transfer heat form the dissipative electronic components into the base plate 730. The combined unit 702 is attached (e.g. bolted) to the cold thermal plate 514. A layer of highly conductive thermal interface material is disposed between a bottom surface of the base plate 730 (opposing the top surface to which the amplifier is bonded) and the top surface 524 of the thermal plate 514. The thermal interface material may be a thermal paste. The thermal paste may be the same thermal paste as used to bond the amplifier to the base plate 730. The base plate 730 includes a layer of thermal material which functions to transfer heat from the amplifier units of the signal amplification module 530 to the thermal plate 514 (i.e. a thermal exchange interface is formed between the thermal material 726 and the top surface 524 of the thermal plate 514 across which heat is transferred from the thermal material 726 to the thermal plate 514).

Figure 7D:
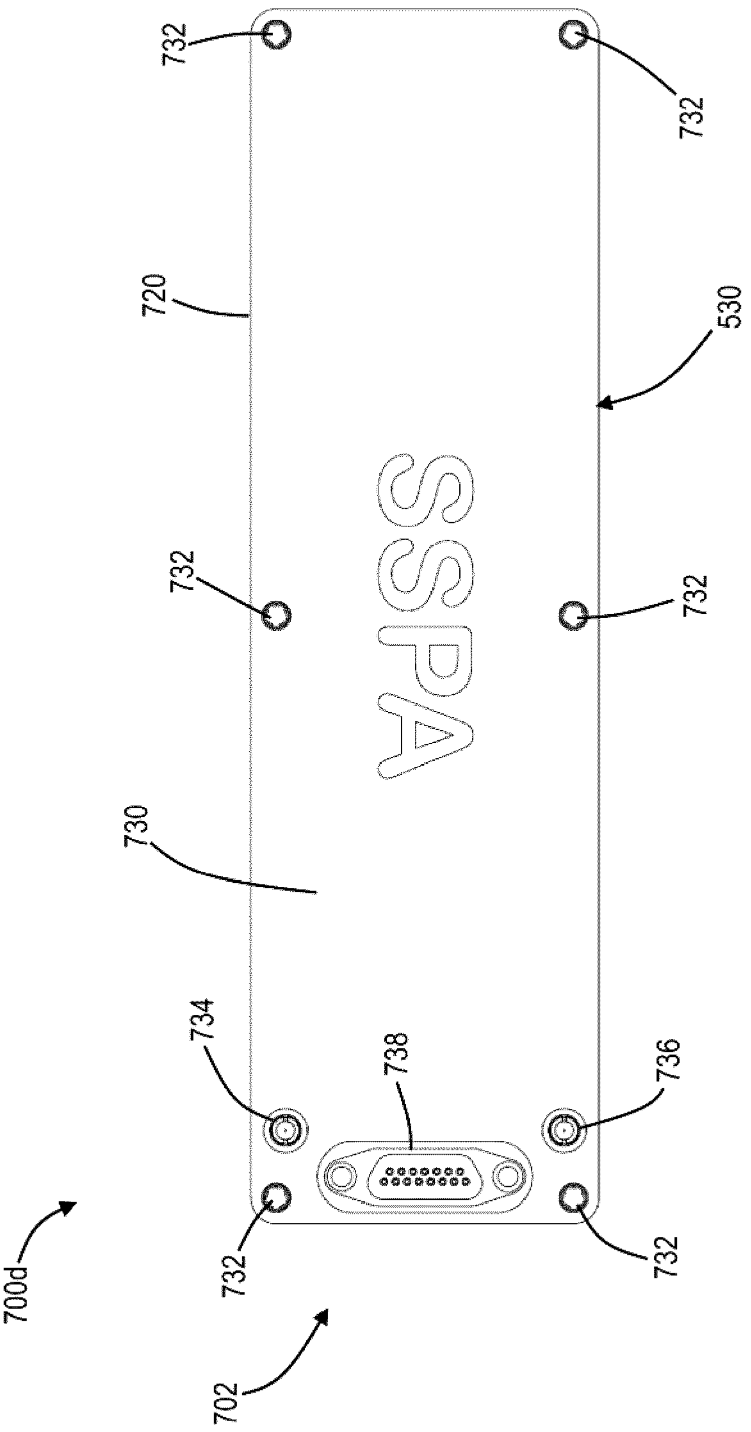
FIG. 7D is a bottom view of the signal amplification module of FIGS. 7A to 7C.

The base plate 730 is adapted to connect to the thermal plate 514 via connectors 732, thereby attaching the combined unit 702 (and the radiating element module) to the thermal plate 514. RF connectors (e.g. RF connectors 916 of FIG. 9) connecting the signal amplification module to the digital beamforming board 518 traverse the thermal plate 514. The base plate 730 includes a plurality of holes for receiving the connectors therethrough to facilitate connection with and mounting to the thermal plate 514. The connector 732 may be a fastener, such as a bolt, screw, or the like. While FIGS. 7A and 7D show the signal amplification module 530 being connected via six connectors 732, the number of connectors 732 (and thus the number of receiving holes in the baseplate for receiving the connectors) may vary and is not particularly limited.

Figure 9:
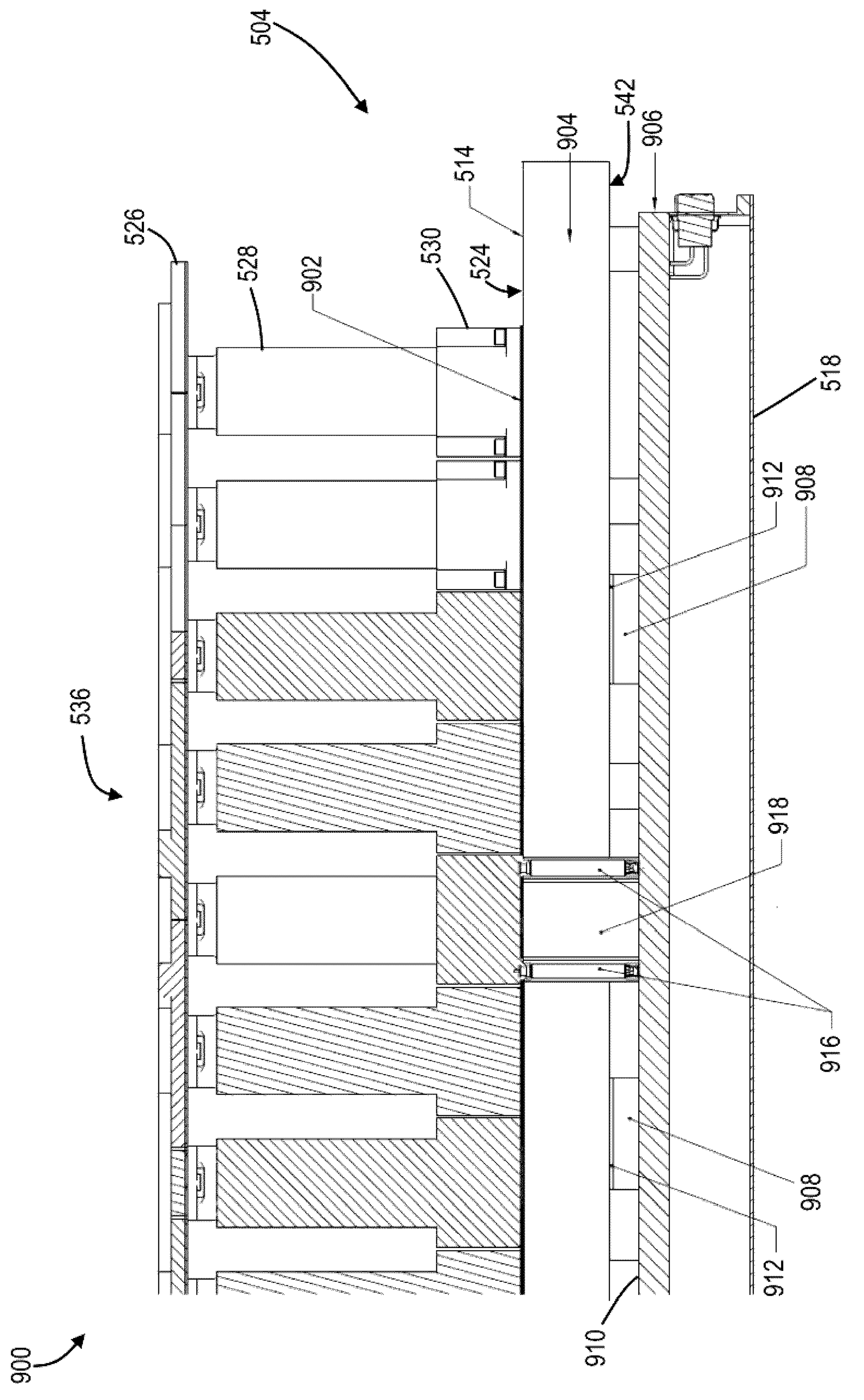
FIG. 9 is a cross-sectional view of the DRA assembly taken along line D-D of FIG. 8 with the DRA assembly shown mounted to the spacecraft bus.

The base plate 730 also includes RF signal interfaces connectors 734, 736 for forming an RF connection between the amplifier units of the signal amplification module 530 and the digital beamforming board 518 to which the amplification module 530 is connected (see, for example, RF connectors 910 of FIG. 9 which may connect into the RF interfaces 734, 736). The RF connectors 734, 736 are RF coaxial connectors which are attached into the combined unit 702 (which houses the SSPA, LNA, and filters). Each of the RF connectors 734, 736 interfaces to a digital board below the thermal plate 514 via a coaxial extension (bullet). The bullet provides RF interconnection between the RF connectors 734, 736 of the combined unit 702 and the RF connectors of the digital PCB. The base plate 730 also includes a DC connector 738 for supplying DC power to the amplifier units 724, 726.

Referring again to FIG. 5, the collection of radiating elements 526 in the radiating array 510 define a radiating surface 536 of the DRA assembly 504. DRA assembly 504 includes 91 radiating elements 526. In other embodiments, the number of radiating elements 526 may vary and is not particularly limited. The radiating elements 526 of the DRA assembly 504 are arranged such that the radiating surface 536 is generally hexagonal. In other embodiments, the arrangement and spacing of the radiating elements 526 may vary and so too may the shape of the radiating surface 536.

Figure 5A:
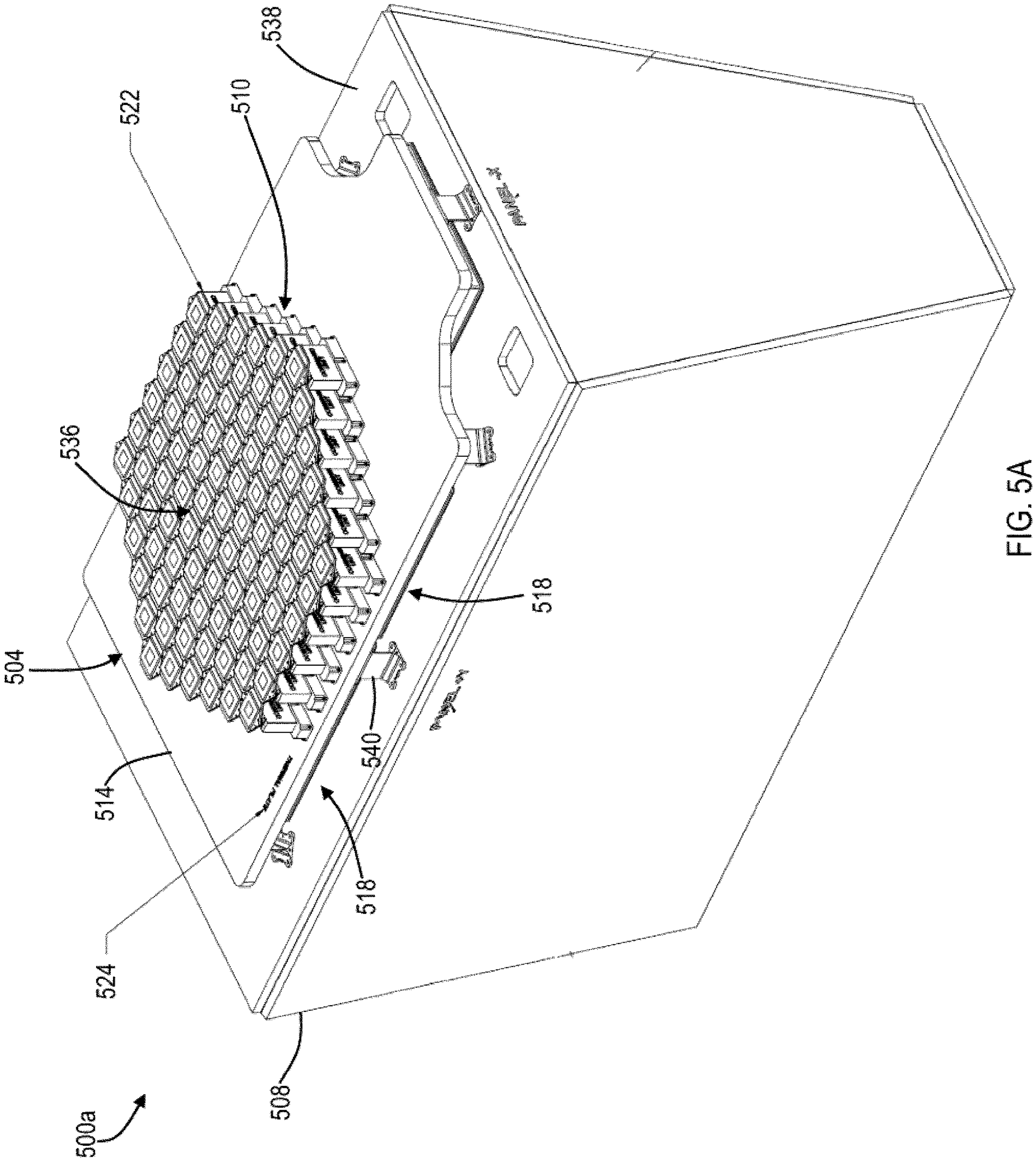
FIG. 5A is a top perspective view of a DRA assembly mounted on a spacecraft bus, according to an embodiment.
Figure 5B:
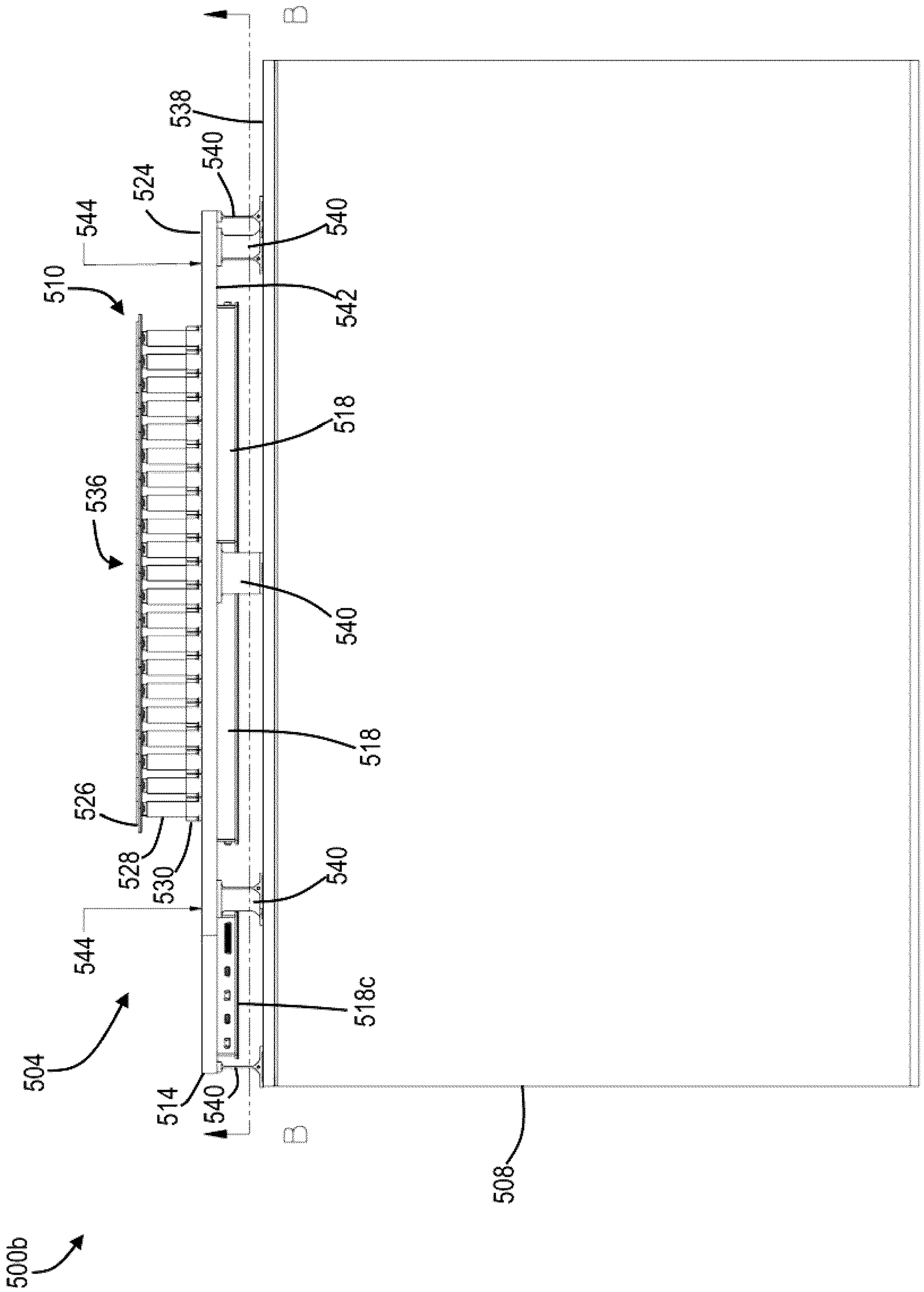
FIG. 5B is a front view of the DRA assembly and spacecraft bus of FIG. 5A.
Figure 5C:
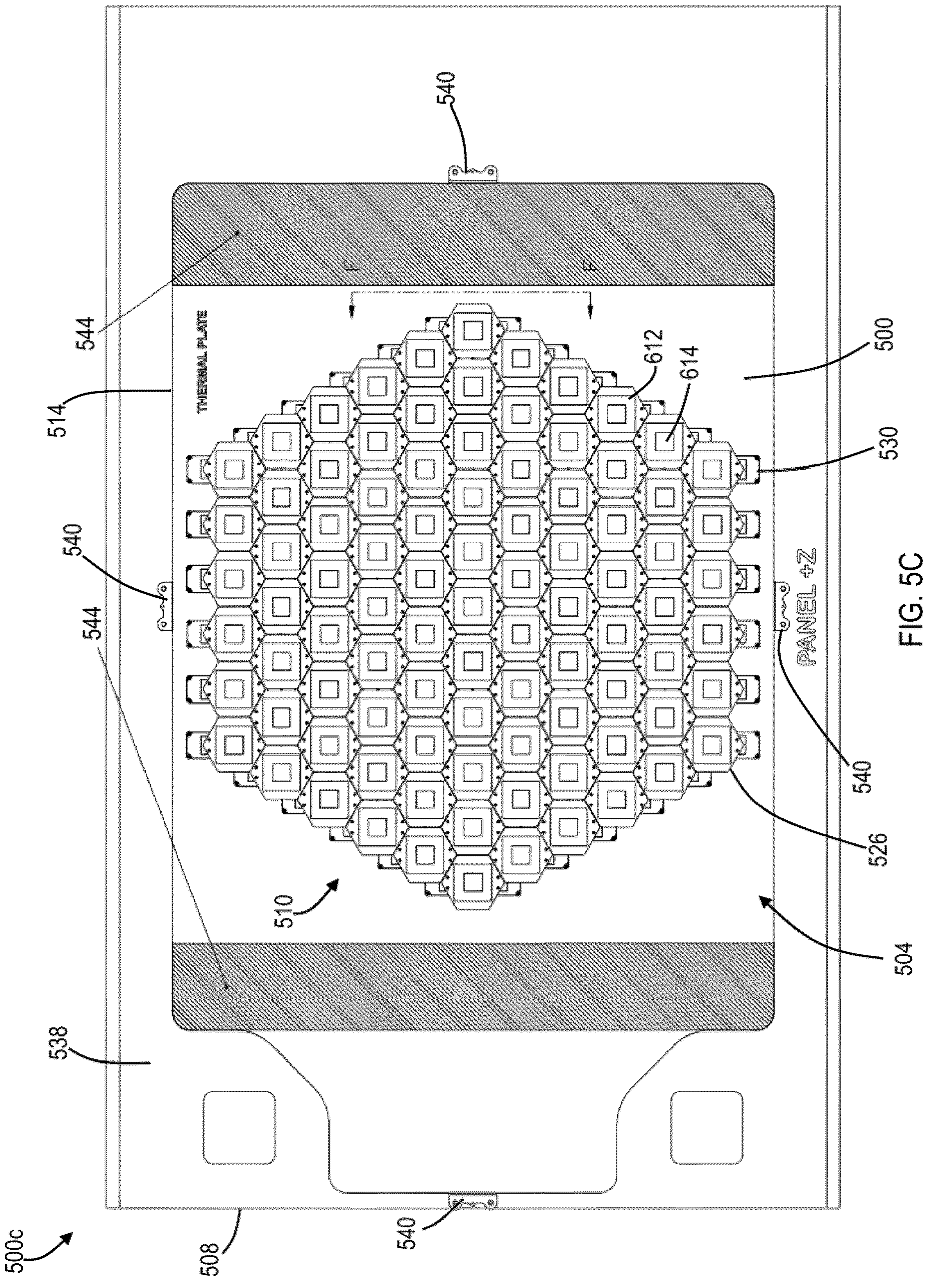
FIG. 5C is a top view of the DRA assembly and spacecraft bus of FIG. 5A.
Figure 5D:
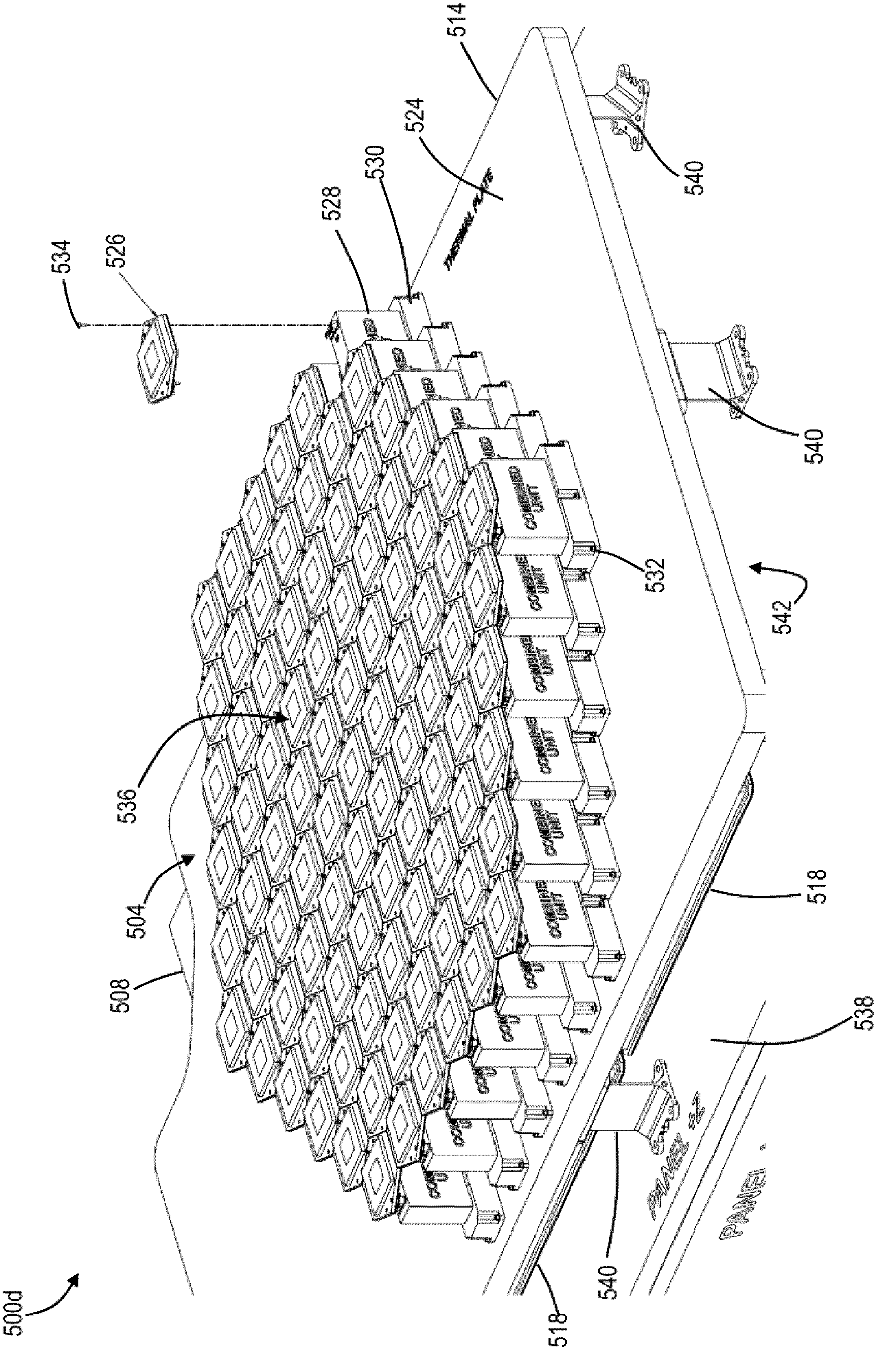
FIG. 5D is a close-up partial perspective view of the DRA assembly of FIG. 5A.

The radiating array 510 is arranged such that the radiating element modules 522 are generally or substantially within the footprint or envelope of the radiating surface 536 (this is best seen in FIG. 5C). In the embodiment of FIG. 5, the radiating surface footprint is generally hexagonal as previously described. This arrangement of the radiating element modules 522 may beneficially provide a compactness to the DRA assembly 504 which can be particularly advantageous in space-based applications (e.g. when deployed on a communications satellite).

The thermal plate 514 is mounted to a top surface 538 of the spacecraft bus 508 via mounting brackets 540. The mounting brackets 540 are positioned generally at the periphery of the thermal plate 514. The mounting brackets 540 connect to a bottom surface 542 of the thermal plate. In the embodiment of FIG. 5, the DRA assembly 504 includes eight mounting brackets 540. In other embodiments, the number of mounting brackets 540 may vary and is not particularly limited.

The thermal plate 514 includes peripheral or side regions 544 on the top surface 524. The peripheral regions 544 are to the side of and outside the footprint of the radiating surface 536 formed by the radiating elements 526. The peripheral regions 544 provide thermal interfaces between the top surface 524 of the thermal plate 514 and spacecraft heat pipes (for example, spacecraft heat pipes 1404 in FIG. 14) when the spacecraft heat pipes are mounted to the thermal plate 514 at the peripheral regions 544.

The thermal plate 514 may have a rigid, light weight closed box structure. In an embodiment, the thermal plate 514 comprises an aluminum panel with a plurality of pulsating heat pipes embedded therein. The embedded pulsating heat pipes then carry the received heat to the sides of the array 510 (i.e. to the peripheral regions 544 of the thermal plate 514). Heat at the peripheral regions 544 can be transferred to spacecraft heat pipes mounted at the peripheral regions 544.

In the DRA assembly 504 of FIG. 5, the thermal plate 514 provides both thermal management and structural support functions. The thermal plate 514 provides a central thermal transport plane between major sources of dissipated heat (amplifier units and digital processing boards). The thermal plate 514 provides a central support structure for the DRA assembly 504 and a thermal control and heat transport mechanism for removing heat from the interior of the DRA assembly 504 to a spacecraft thermal interface. In doing so, heat can be efficiently removed from the array 504 and transported to spacecraft thermal radiators where the heat can be dumped to the external environment (i.e. space).

Figure 8:
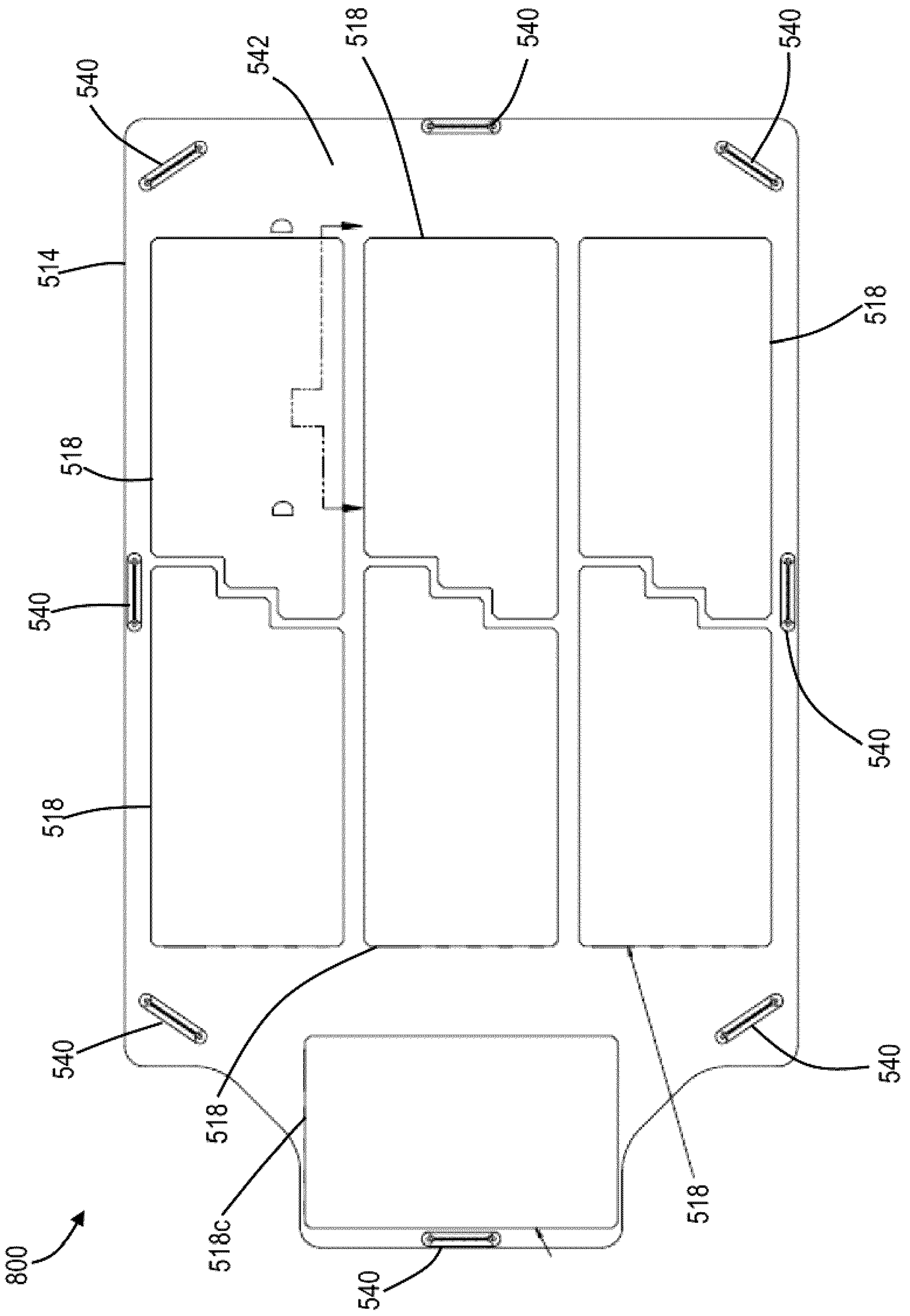
FIG. 8 is a bottom view of the DRA assembly of FIGS. 5A to 5D in isolation, according to an embodiment.

Referring now to FIG. 8, shown therein is a bottom view 800 of the DRA assembly 504 of FIG. 5 in isolation, according to an embodiment. Note that the radiating array 510 is not visible in FIG. 8.

FIG. 8 shows the plurality of digital board assemblies 518. Each digital board assembly 518 includes a digital beamforming processing board (e.g. FPGA). The digital beamforming board includes one or more beamforming integrated circuits for performing digital beamforming. The beamforming integrated circuit may be an FPGA. The digital board assemblies 518 are mounted to the bottom surface 542 of the thermal plate 514 such that good contact is made between the digital board assemblies 518 and the thermal plate 514 for heat transfer. The digital beamforming assemblies 518 are each positioned on the thermal plate 514 such that they are located under and in proximity to the radiating elements 526 served by that particular digital beamforming board. The C-band digital board assembly 518*c* is also mounted to the bottom surface 542 of the thermal plate 514.

The digital beamforming board assemblies 518 are distributed on the thermal plate 514 in a tiled configuration (i.e. as “tiles”) where each digital beamforming board assembly 518 connects to and services a subset of the radiating elements 526 in the radiating array 510. In the DRA assembly 504 of FIG. 5, each digital beamforming board assembly 518 services 15 to 16 radiating elements 526 (for Rx and Tx). Each digital beamforming board assembly 518 is positioned on the thermal plate 514 such that the assembly 518 is in the general area or footprint of the radiating elements 526 that it services. In doing so, the radiating element module 522 can connect into the board assembly 518 without the need for cables or other complicated connections. The tiled configuration of the board assemblies 518 may greatly simplify the beamforming complexity of an interconnectivity within the DRA 504. The physical arrangement of the digital board assemblies 518 in this manner may reduce profile and mass of the DRA assembly 504.

Each digital processing board may be present in in duplicate (i.e. a “prime” and a “redundant”).

In an embodiment, the digital beamforming board assemblies 518 are configured to perform distributed beamforming where each digital beamforming board performs partial beamforming for a subset of radiating elements 526 (those to which it is connected) and final beamforming for a subset of beams (e.g. 8).

FIG. 8 also shows the mounting brackets 540 used to connect the thermal plate 514 (and thus the DRA assembly 504) to the spacecraft panel.

Referring now to FIG. 9, shown therein is a cross-sectional partial view 900 of the DRA assembly 504 taken along line D-D of FIG. 8, according to an embodiment.

View 900 shows a subset of radiating element modules including radiating elements 526, filtering modules 528, and signal amplification modules 530 mounted to thermal plate 514.

The DRA assembly 504 includes a thermal material 902 disposed between the signal amplification modules 530 and the top surface 524 of the thermal plate 514 (e.g. between bottom surface of baseplate 730 of signal amplification module 530 and top surface 524 of thermal plate 514). The thermal material 902 may be a highly conductive thermal interface material. The thermal material 902 may be a thermally conductive paste. A thermal exchange interface is created between the thermal material 902 and the top surface 524 of the thermal plate 514 to facilitate heat transfer from the signal amplification modules 530 to the thermal plate 514.

The thermal plate 514 includes thermal hardware 904 embedded therein. The thermal hardware 904 includes a plurality of pulsating heat pipes for transporting received heat to the sides of the array 504 (peripheral regions 544 of thermal plate 514).

The digital board assembly 518 includes a digital printed circuit board ("digital PCB") 906. The digital PCB 906 is mounted to the bottom surface 542 of the thermal plate 514. High dissipating components on the digital PCB 906, such as digital beamforming integrated circuits 908 (e.g. FPGAs), are mounted to a top surface 910 of the digital PCB 906 facing the thermal plate 514 so that the beamforming ICs 908 can be heat sunk to the thermal plate 514 using a layer of thermally conductive interface material 912 (e.g. thermal paste) disposed between the beamforming ICs 908 and the bottom surface 542 of the thermal plate 514.

The signal amplification module 530 is connected to the PCB 906 of the digital beamforming board assembly 518 via RF connectors 916. The digital beamforming assembly 518 in FIG. 9 has its chassis removed to show interconnection between the board 906 and the amplifier units (e.g. SSPA, LNA) of the signal amplification module 530. The RF connectors 910 facilitate transmission of RF signals between the PCB 906 and the signal amplification module 530 (i.e. the LNA and the SSPA). The RF connectors 916 include coaxial extensions or RF bullets that provide RF interconnection between the RF interface connectors of the signal amplification module 530 and the RF connectors of the digital PCB 906. The RF connectors 916 include first and second opposing ends for connecting to the PCB 906 and signal amplification module 530, respectively, and extend through the thermal plate 514. The thermal plate 514 includes channels constructed therein to accommodate the RF connectors 916 and facilitate their passing through the thermal plate 514.

The DRA assembly 504 also includes a DC connector 918 for receiving a DC power supply for the PCB 908.

Figure 10:
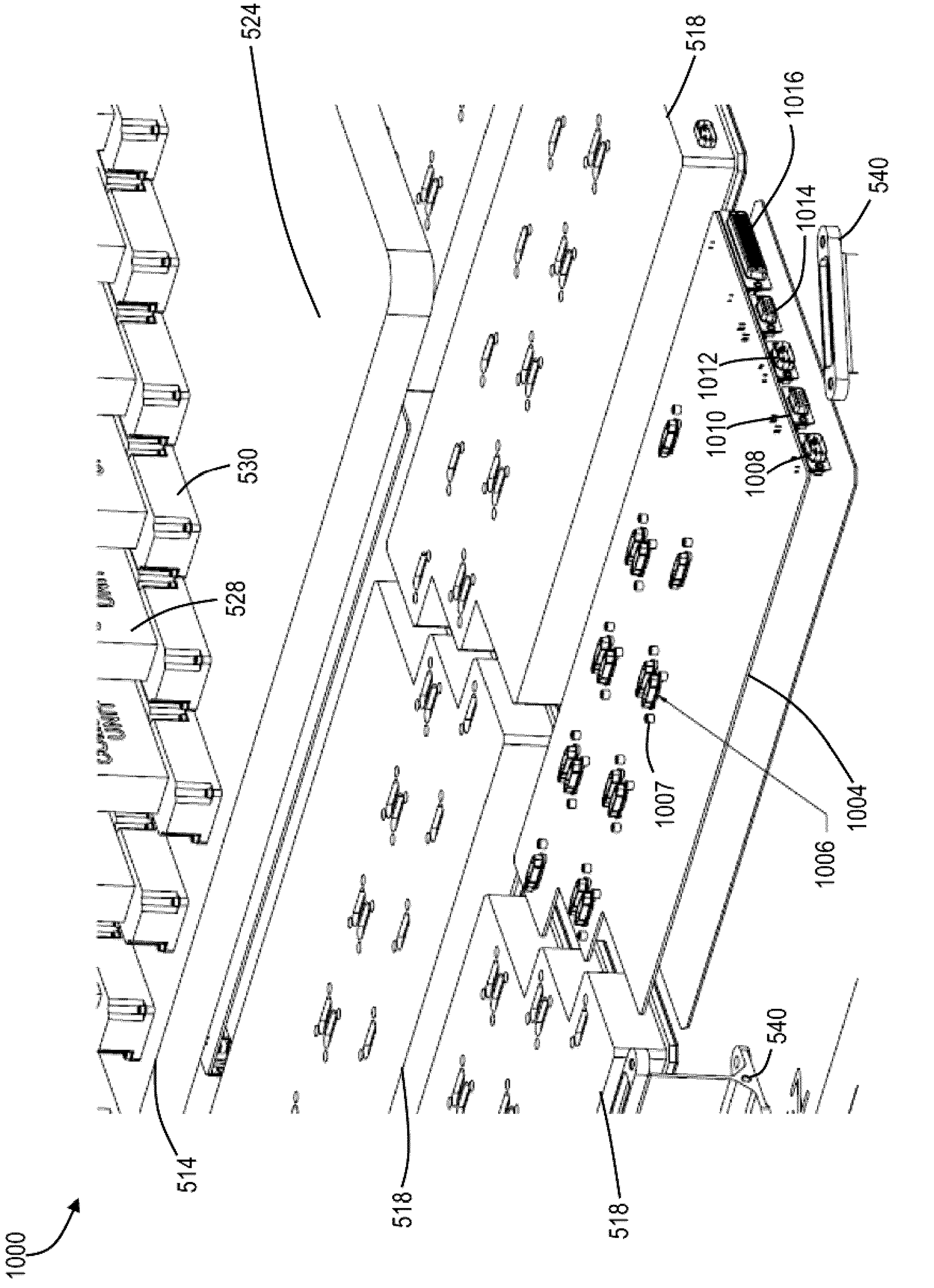
FIG. 10 is a partial perspective view of the DRA assembly of FIGS. 5A to 5D showing a portion of the thermal plate and radiating element modules removed to expose the digital beamforming boards.

Referring now to FIG. 10, shown therein is a close-up partial view 1000 of the DRA assembly 504 with the thermal plate 514 (having radiating array 510 mounted to a top surface 524 thereof) pulled back to expose some of the digital beamforming board assemblies 518.

FIG. 10 shows a digital beamforming board 1004 having its chassis removed, in addition to other board assemblies 518.

The board 1004 includes a plurality of DC connectors 1006 for providing DC power to the radiating element modules 522 and a plurality of RF connectors 1007 for transmitting and receiving RF signals to and from the radiating array 510. The number of DC connectors may correspond with the number of radiating element modules 522 to which the board 1004 is connected. The number of RF connectors 1007 may correspond with the number of radiating elements 526 to which the board 1004 is connected. In the case of a dual band radiating array, the number of RF connectors 1007 is multiplied by two (for Rx and Tx).

The board 1004 also includes connectors 1008, 1010, 1012, 1014, 1016 representing DC and/or digital interconnections within the DRA or coming from an external bus power subsystem.

Figure 11:
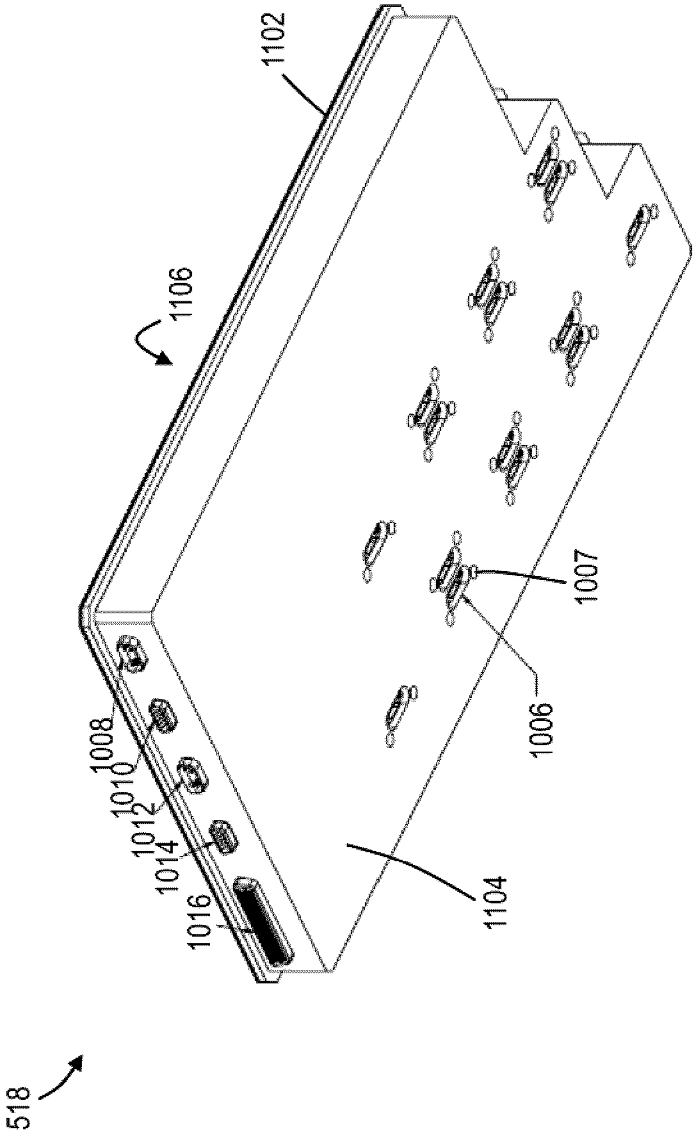
FIG. 11 is a perspective view of a digital beamforming board assembly of FIG. 8 in isolation.

Referring now to FIG. 11, shown therein is a digital beamforming board assembly 518 of the DRA assembly 504 in isolation, according to an embodiment. Generally, the board assembly 518 includes a digital PCB (e.g. PCB 906 of FIG. 9) that sits in a housing. The housing may be aluminum. The digital PCB and the housing are both bolted or otherwise attached to the thermal plate 514. A cover is installed on the housing. The cover may be aluminum.

The board assembly 518 includes a chassis 1102 and has a top surface 1104 and a bottom surface 1106 opposing the top surface 1104. In the assembled DRA 504, the top surface 1104 is mounted to the bottom surface 542 of the thermal plate 514.

The board assembly 518 includes a plurality of DC interfaces 1006 and RF interfaces 1007 which are exposed through the top surface 1104 for interfacing with the radiating array 510. In the DRA assembly 504, each DC interface 1006 connects to a DC connector (e.g. DC connector 912 of FIG. 9) and each RF interface 1007 connects to an RF connector (e.g. RF connector 916 of FIG. 9). The RF connector 916 has a first end for connecting to the RF interface 1007 extends through the thermal plate 514 to a second end, opposing the first end, which is configured to connect to and RF interface of the signal amplification module 530.

Figure 12:
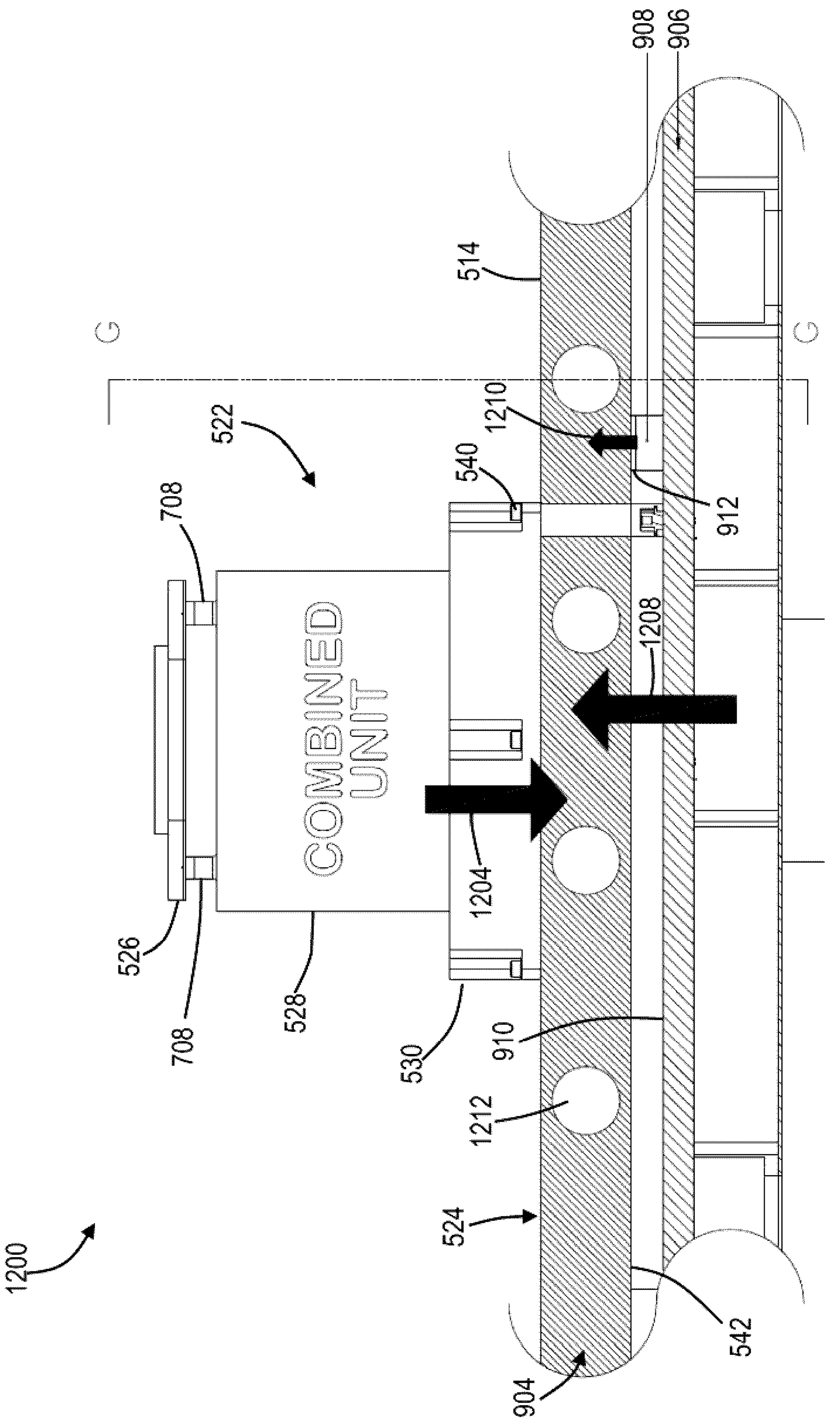
FIG. 12 is a cross-sectional view taken along line F-F of FIG. 5C modified to show a single radiating element module and illustrating heat flow from radiating element modules and digital boards into the thermal plate, according to an embodiment.

Referring now to FIG. 12, shown therein is a cross-sectional partial view 1200 of the DRA assembly 504 taken along line F-F of FIG. 5C illustrating heat flow, according to an embodiment.

FIG. 12 illustrates a single radiating element module 522 mounted to the top surface 524 of the thermal plate 514. While a single radiating element 522 is shown, it is to be understood that this is for clarity purposes and that other radiating element modules 522 are present in the DRA assembly 504 but not shown. Accordingly, the principles of heat flow illustrated in FIG. 12 are applicable to other radiating elements modules 522 (and other digital board assemblies 518) in the DRA assembly 504.

FIG. 12 further illustrates a single digital beamforming board assembly 518 (e.g. board assembly 518 of FIG. 11) mounted to the bottom surface 542 of the thermal plate 514.

As illustrated, the thermal plate 514 provides a structural support for the radiating element module 522 and the digital beamforming board assembly 518.

Heat generated by heat generating components of the radiation element module 522, such as the amplifier units (e.g. LNA 724, SSPA 726), is transferred to the thermal plate 514 along heat dissipation path 1204.

Similarly, heat generated by the digital beamforming board assembly 518 is transferred to the thermal plate 514 along heat dissipation path 1208.

The thermal plate 514 includes heat pipes 1212 (e.g. pulsating heat pipes) embedded in the thermal plate 514 (the heat pipes 1212 are shown schematically as circles). The heat received by the thermal plate 514 from dissipative components via heat paths 1204, 1208, 1210 is transferred to the heat pipes 1212 which transport the heat outwards from the center of the thermal plate 514 to the peripheral regions 544 (not visible in FIG. 12).

Figure 13:
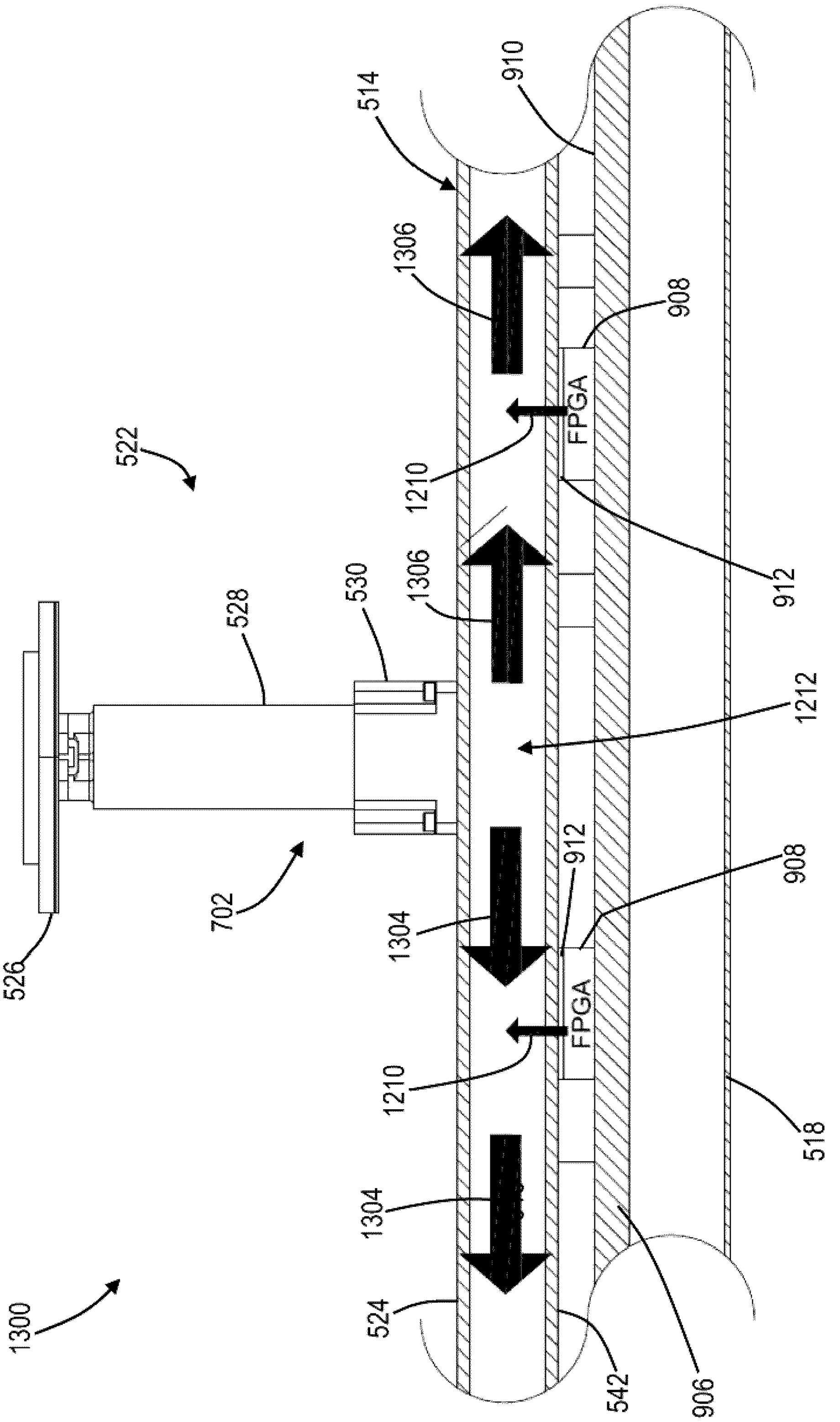
FIG. 13 is a cross-sectional view taken along line G-G of FIG. 12 illustrating heat flow from an internal section of the thermal plate outwards towards first and second opposing ends of the thermal plate.

Referring now to FIG. 13, shown therein is a cross-sectional view of the DRA assembly 504 taken along line G-G of FIG. 12 illustrating heat flow, according to an embodiment. As in FIG. 12, only one radiating element 522 is shown for clarity.

The radiating element module 522 is mounted to the top surface 524 of the thermal plate 514. The radiating element module 522 includes radiating element 526, filtering module 528, and signal amplification module 530. Digital beamforming board assemblies 518 and C-band digital board assembly 518_c_ are mounted to the bottom surface 542 of the thermal plate 514.

Dissipated heat received by the thermal plate 514 from the signal amplification module 530 and the digital board assemblies 518 (including FPGA 908), as illustrated in FIG. 12, is transported by the thermal plate 514 via heat pipes 1212 along heat transfer paths 1304, 1306 away from the radiating array and towards the peripheral regions 544 (not visible in FIG. 13) of the thermal plate 514. Heat flows from the internal or middle section of the thermal plate 514 towards the ends 544 which provide an interface with spacecraft heat pipes.

Referring now to FIG. 14, shown therein is a thermal management subsystem 1400 for managing heat generated by the DRA assembly 504, according to an embodiment. The thermal management subsystem 1400 may be the DRA thermal management subsystem 400 of FIG. 4.

The DRA assembly 504 is shown mounted to the top surface 538 of the spacecraft bus 508 as in FIG. 5.

The thermal management subsystem 1400 includes the thermal plate 514, spacecraft heat pipes 1404, and a thermal radiating panel 1408. The thermal plate 514, spacecraft heat pipes 1404 and thermal radiating panel 1408 may be the thermal plate 322, spacecraft heat pipes 412, and thermal radiating panel 416, respectively, of FIG. 4.

The spacecraft bus 508 includes side surface or panel 1412. Thermal radiating panel 1408 may be mounted to or otherwise be a component of the spacecraft panel 1412.

The spacecraft heat pipes 1404 are mounted to the top surface 524 of the thermal plate 514 at the peripheral regions 544, thereby forming a first thermal exchange interface between the thermal plate 514 and the spacecraft heat pipes 1404. The spacecraft heat pipes 1404 include a first set of spacecraft heat pipes mounted at a first peripheral region 544 to a first side of the DRA assembly 504 and a second set of spacecraft heat pipes mounted at the second peripheral region 544 to a second side of the DRA assembly 504. The term "set" when referring to the first and second sets of spacecraft heat pipes is intended to mean one or more, though in many applications, including the embodiment shown in FIG. 14, the first and second sets each include a plurality of spacecraft heat pipes. The spacecraft heat pipes 1404 are further mounted to the radiating panel 1408, thereby forming a second thermal exchange interface between the spacecraft heat pipes 1404 and the thermal radiating panel 1408.

As previously described, the thermal plate 514 receives heat dissipated from the heat generating components of the DRA assembly 504 and transports the heat from the center of the array 504 towards peripheral regions 544 along heat transfer path 1416.

Heat is transferred from the thermal plate 514 to the spacecraft heat pipes 1404 across the first thermal exchange interface. The spacecraft heat pipes 1404 draw or remove heat from the thermal plate 514 and transport the heat along heat transfer path 1420.

Heat is transported by the spacecraft heat pipes 1404 to the second thermal exchange interface where the heat is transferred from the spacecraft heat pipes 1404 to the thermal radiating panel 1408 (see heat transfer path 1424). The thermal radiating panel 1408 then expels the received heat along heat radiation path 1428.

The thermal design of the thermal management subsystem 1400 may be very efficient as it minimizes temperature gradients between the DRA assembly 504 and the thermal radiating panel 1408. As previously described, the top surface 524 of the thermal plate 514 includes two areas 544 set aside as the interface for the spacecraft heat pipes 1404 which remove the heat directly from the DRA 504 and transport the heat directly to the thermal radiative panel 1408 via the spacecraft heat pipes 1404 (a total of three gradients). This is a particularly advantageous solution as the heat is not transported across multiple panel interfaces where temperature gradients occur across each interface and within each panel. Without the thermal interfaces provided, the DRA heat may otherwise have to go into the Nadir (Earth facing) panel to which it is mounted, be picked up by heat pipes embedded in that panel, spread towards the radiative panel, be picked up by internally mounted heat pipes between the two panels and then spread within the radiative panel (for a total of five separate temperature gradients). Thus, one particular advantage of the thermal management subsystems described herein is the reduction or minimization of temperature gradients between the DRA 504 and the radiative panel 1408, which may significantly increase efficiency of thermal management of DRA heat.

While the above description provides examples of one or more apparatus, methods, or systems, it will be appreciated that other apparatus, methods, or systems may be within the scope of the claims as interpreted by one of skill in the art.

The invention claimed is:

1. A digital direct radiating array ("DRA") antenna assembly, the assembly comprising:

a single continuous thermal plate configured to receive heat from dissipative components of the DRA assembly and transport the heat away from an interior of the DRA assembly;

a plurality of radiating element modules, each respective one of the plurality of radiating element modules including a radiating element and a combined unit, wherein the combined unit includes a filtering module and a signal amplification module, wherein a bottom surface of the combined unit is mounted to a top surface of the thermal plate, and wherein the radiating element is mounted to a top surface of the combined unit; and a plurality of digital boards for digital beamforming, each respective one of the plurality of digital boards having a radio frequency ("RF") connection to and servicing a subset of the radiating element modules, the plurality of digital boards mounted to a bottom surface of the thermal plate such that each respective one of the plurality of digital boards is located under the subset of the radiating element modules serviced thereby;

wherein the thermal plate acts as a structural support for each of the plurality of radiating element modules and each of the plurality of digital boards;

wherein the thermal plate comprises a panel with a rigid, closed box structure having a plurality of pockets and a plurality of flat pulsating heat pipe (PHP) subpanels embedded within the pockets of the panel, the plurality of flat PHP subpanels configured to transport the heat outwards from the center of the thermal plate to a plurality of peripheral regions outside a footprint of a radiating surface formed by the radiating elements.

2. The DRA assembly of claim 1, wherein the radiating element is a dual band radiating element.

3. The DRA assembly of claim 1, wherein the combined unit is substantially within an element footprint of the radiating element.

4. The DRA assembly of claim 1, wherein the plurality of radiating elements form a radiating array, and wherein the plurality of digital boards are substantially within a footprint of the radiating array.

5. The DRA assembly of claim 1, wherein each of the plurality of radiating modules includes a first dissipative component and each of the plurality of digital boards includes a second dissipative component, wherein the first dissipative component is an amplifier unit of the signal amplification module and the second dissipative component is a digital beamforming integrated circuit of the digital board.

6. The DRA assembly of claim 5, wherein the thermal plurality of peripheral regions provide a thermal exchange interface between the thermal plate and spacecraft heat pipes mounted thereto.

7. A method of assembling a digital direct radiating array ("DRA") antenna assembly, the method comprising:

mounting a plurality of combined units to a top surface of a support plate, wherein each respective one of the plurality of combined units includes a filtering module and a signal amplification module, and wherein the mounting includes mounting a bottom surface of the combined unit to the top surface of the support plate;

mounting a radiating element to a top surface of each respective one of the plurality of combined units, wherein the radiating element and the combined unit to which the radiating element is mounted together form a radiating element module, and wherein the mounting includes forming a first RF connection between the radiating element and the combined unit; and mounting a plurality of digital beamforming boards to a bottom surface of the support plate such that each respective one of the plurality of digital boards is located under a subset of the radiating element modules serviced by the digital beamforming board, and wherein the mounting includes forming a second RF connection between the digital beamforming board and the subset of radiating element modules serviced thereby;

wherein the support plate is a single continuous thermal plate configured to transport heat outwards from a center of the thermal plate to peripheral regions outside a footprint of a radiating surface formed by the radiating elements;

wherein the thermal plate acts as a structural support for each of the plurality of radiating element modules and each of the plurality of digital boards;

wherein the thermal plate comprises a panel with a rigid, closed box structure having a plurality of pockets and a plurality of flat pulsating heat pipe (PHP) subpanels embedded within the pockets of the panel, the plurality of flat PHP subpanels configured to transport the heat outwards from the center of the thermal plate to a plurality of peripheral regions.

8. The method of claim 7, further comprising mounting the support plate to a spacecraft bus.

9. The method of claim 7, wherein the DRA assembly is a dual band radiating array that performs receive and transmit functions, wherein the filtering module includes a receive filtering unit configured to filter receive signals and a transmit filter unit configured to filter transmit signals and input and output connections for receiving and transmitting signals from and to the signal amplification module, wherein the signal amplification module includes a receive signal amplification unit and a transmit signal amplification unit and the signal amplification module routes filtered signals from the filtering module to the receive signal amplification unit for amplification and transmit signals from the transmit signal amplification unit to the filtering module, and wherein the signal amplification module routes signals received from the plurality of digital boards to the transmit signal amplification unit for signal amplification and amplified receive signals from the receive amplification unit to the plurality of digital boards.

10. The method of claim 7, wherein each respective one of the plurality of radiating elements includes a first dissipative component and the radiating element is mounted such that the first dissipative component is heat sunk to the support plate, wherein each respective one of the plurality of digital beamforming boards includes a second dissipative component and the digital board is mounted such that the second dissipative component is heat sunk to the support plate.

11. The method of claim 10, wherein the first dissipative component is an amplifier unit of the signal amplification module and the second dissipative component is a digital beamforming integrated circuit.

12. The method of claim 10, further comprising mounting the support plate to a spacecraft bus.

* * * * *